US012780102B2

(12) United States Patent
Qi et al.

(10) Patent No.: US 12,780,102 B2
(45) Date of Patent: Nov. 3, 2026

(54) COMPONENT FOR VEHICLE INTERIOR

(71) Applicant: Shanghai Yanfeng Jinqiao Automotive Trim Systems Co. Ltd., Novi, MI (US)

(72) Inventors: Songfei Qi, Shanghai (CN); Yan Gao, Shanghai (CN); You Li, Shanghai (CN); Siyuan Liu, Shanghai (CN); Gengbo Yao, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 369 days.

(21) Appl. No.: 18/391,609

(22) Filed: Dec. 20, 2023

(65) Prior Publication Data

US 2024/0123906 A1 Apr. 18, 2024

Related U.S. Application Data

(63) Continuation of application No. PCT/CN2022/101934, filed on Jun. 28, 2022.

(30) Foreign Application Priority Data

Jun. 28, 2021 (CN) ......................... 202110719690.6

(51) Int. Cl.
*B60R 7/04* (2006.01)
*B65D 43/16* (2006.01)
(Continued)

(52) U.S. Cl.
CPC .............. *B60R 7/04* (2013.01); *B65D 43/164* (2013.01); *B65D 43/22* (2013.01); *B65D 43/24* (2013.01); *B65D 43/26* (2013.01)

(58) Field of Classification Search
CPC ........ B60R 7/04; B65D 43/24; B65D 43/164; B65D 43/22; B65D 43/26
(Continued)

(56) References Cited

U.S. PATENT DOCUMENTS 5,109,573 A * 5/1992 Sherman ............... G06F 1/1616 16/342
5,165,145 A * 11/1992 Sherman ............... G06F 1/1681 16/303
(Continued)

FOREIGN PATENT DOCUMENTS

CN 101876338 A 11/2010
CN 204386321 U 6/2015
(Continued)

OTHER PUBLICATIONS

Delling; Gerhard et al., PDF file for prior art patent number U.S. Pat. No. 9950651-B2 with paragraph Nos., Apr. 24, 2018.*
(Continued)

*Primary Examiner* — Kambiz Abdi
(74) *Attorney, Agent, or Firm* — Amin, Turocy & Watson LLP

(57) ABSTRACT

A component for a vehicle interior may comprise a cover movable at a pivot joint relative to a base between a closed position and an open position through an intermediate position. The cover may comprise a composite hinge/pivot mechanism providing the pivot joint and configured so that the cover is movable from the closed position toward the intermediate position by a drive mechanism; the cover may be retained by a retaining mechanism and/or movable between the intermediate position and the open position by manual/hand action; the cover may be retained by a retaining mechanism and/or movable from the open position toward the closed position by manual/hand action. The drive mechanism may comprise a spring; the retaining mechanism may comprise a set of friction plates. The composite/hinge mechanism may comprise a clutch mechanism. The component may comprise a console providing a compartment and/or armrest.

20 Claims, 19 Drawing Sheets

(51) Int. Cl.

| | |
|---|---|
| ***B65D 43/22*** | (2006.01) |
| ***B65D 43/24*** | (2006.01) |
| ***B65D 43/26*** | (2006.01) |

(58) Field of Classification Search
USPC .................................................... 296/24, 30
See application file for complete search history.

(56) References Cited

U.S. PATENT DOCUMENTS

| | | | | |
|---|---|---|---|---|
| 5,466,028 | A * | 11/1995 | Nicopolis | B60R 7/04 296/37.16 |
| 6,652,032 | B2 * | 11/2003 | Laval | B60N 2/753 297/411.32 |
| 6,883,680 | B2 | 4/2005 | Hirose | |
| 7,640,628 | B2 * | 1/2010 | Hu | F16M 11/10 16/340 |
| 8,943,650 | B2 | 2/2015 | Anderson et al. | |
| 9,950,651 | B2 * | 4/2018 | Delling | B60N 2/767 |
| 10,071,662 | B2 * | 9/2018 | Choi | B60N 2/767 |
| 12,187,232 | B2 * | 1/2025 | Gadhari | B60R 7/04 |
| 2003/0046791 | A1 | 3/2003 | Choi | |
| 2009/0106938 | A1 | 4/2009 | Mori | |
| 2013/0097809 | A1 | 4/2013 | Weber et al. | |
| 2015/0267451 | A1 * | 9/2015 | Hirai | E05D 3/02 16/279 |
| 2019/0136592 | A1 * | 5/2019 | Muntean | B60N 2/793 |
| 2021/0053474 | A1 * | 2/2021 | Chen | B60N 2/793 |
| 2021/0170952 | A1 * | 6/2021 | Nuss | B60N 2/767 |
| 2023/0020916 | A1 * | 1/2023 | Kwon | E05B 77/36 |
| 2023/0077871 | A1 * | 3/2023 | Matlin | F16M 11/125 248/176.1 |
| 2023/0158931 | A1 * | 5/2023 | Li | B60N 2/763 296/1.09 |
| 2025/0353438 | A1 * | 11/2025 | Torii | B60R 7/04 |

FOREIGN PATENT DOCUMENTS

| | | | |
|---|---|---|---|
| CN | 105197380 | A | 12/2015 |
| CN | 207173388 | U | 4/2018 |
| CN | 110329160 | A | 10/2019 |
| CN | 210760500 | U | 6/2020 |
| CN | 111469771 | A | 7/2020 |
| CN | 113264278 | A | 8/2021 |
| DE | 10 2008 030 387 | A1 | 1/2009 |
| DE | 10 2008 030 384 | A1 | 2/2009 |
| DE | 10 2018 120 087 | B3 | 1/2020 |
| FR | 2 886 898 | A1 | 12/2006 |
| JP | 2013 189774 | A | 9/2013 |
| WO | 2013/064213 | A1 | 5/2013 |
| WO | 2017/180891 | A1 | 10/2017 |
| WO | 2020/198204 | A1 | 10/2020 |
| WO | 2020/258781 | A1 | 12/2020 |

OTHER PUBLICATIONS

Extended European Search Report received for European Patent Application Serial No. 22832048.7 dated Mar. 25, 2025, 9 pages.
International Search Report and Written Opinion received for PCT Application Serial No. PCT/CN2022/101934 dated Sep. 15, 2022, 12 pages.
First Office Action received for Chinese Patent Application Serial No. 202110719690.6 dated Jul. 20, 2022, 11 pages.
Second Office Action received for Chinese Patent Application Serial No. 202110719690.6 dated Mar. 29, 2023, 8 pages.
Notification to Grant Patent Right for Invention received for Chinese Patent Application Serial No. 202110719690.6 dated Oct. 24, 2023, 3 pages.
Communication pursuant to Article 94(3) EPC for European Application No. 22832048.7 dated Jun. 26, 2026, 4 pages.

* cited by examiner

FIG. 20M
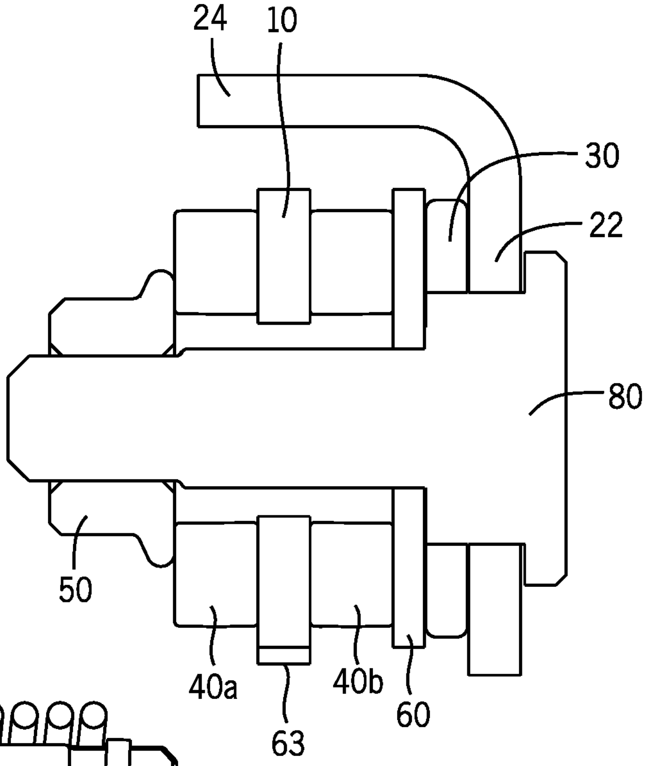
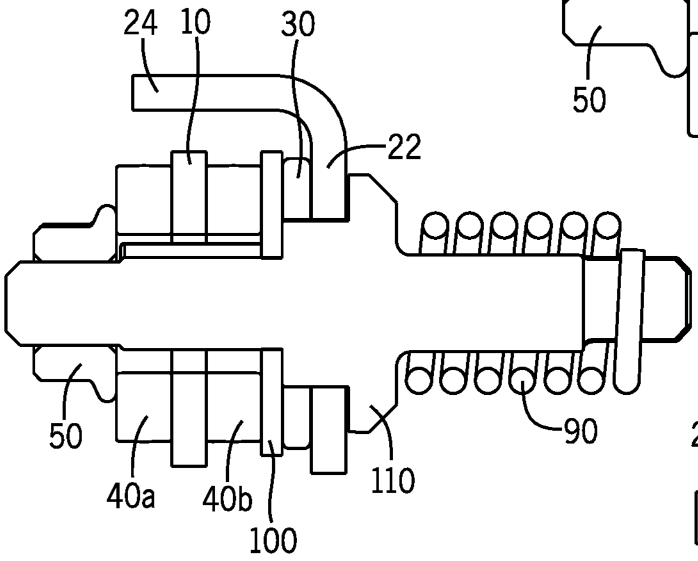
FIG. 20N
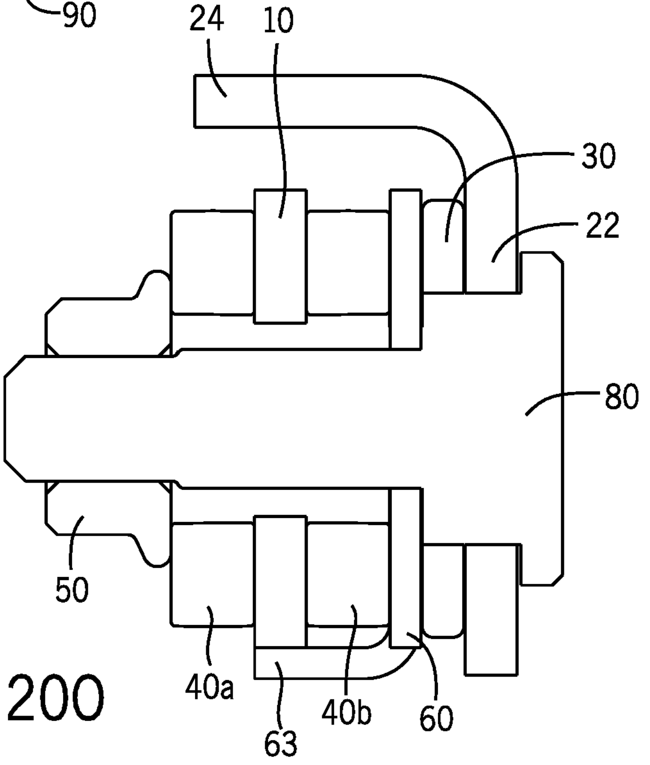
FIG. 20O

COMPONENT FOR VEHICLE INTERIOR

CROSS-REFERENCE TO RELATED APPLICATIONS

The present application is a continuation of PCT/International Patent Application No. PCT/CN2022/101934 titled "COMPONENT FOR VEHICLE INTERIOR" filed Jun. 28, 2022, which claims the benefit of Chinese Patent Application No. 202110719690.6 filed Jun. 28, 2021.

The present application claims priority to and incorporates by reference in full the following patent applications: (a) Chinese Patent Application No. 202110719690.6 filed Jun. 28, 2021; (b) PCT/International Patent Application No. PCT/CN2022/101934 titled "COMPONENT FOR VEHICLE INTERIOR" filed Jun. 28, 2022.

FIELD

The present invention relates to component for a vehicle interior.

The present invention also relates to component for a vehicle interior with a hinge/pivot mechanism.

BACKGROUND

It is known to provide a component in a vehicle interior with a component such as a console with a base providing a compartment and a cover movable relative to the base to facilitate access to the compartment.

It would be advantageous to provide an improved component for a vehicle interior with a base and a cover and an improved hinge/pivot mechanism.

It would be advantageous to provide an improved component for a vehicle interior with a base and a cover and an improved hinge/pivot mechanism so that the cover is movable between a closed position and an open position through an intermediate position.

It would be advantageous to provide an improved component for a vehicle interior with a base and a cover and an improved hinge/pivot mechanism so that the cover is movable from the closed position toward the intermediate position by a drive mechanism.

It would be advantageous to provide an improved component for a vehicle interior with a base and a cover and an improved hinge/pivot mechanism so that the cover is retained and/or movable between the intermediate position and the open position by manual/hand action.

It would be advantageous to provide an improved component for a vehicle interior with a base and a cover and an improved hinge/pivot mechanism so that the cover is retained and/or movable from the open position toward the closed position by manual/hand action.

SUMMARY

The present invention relates to a component for a vehicle interior configured to be operated by a vehicle occupant comprising a base; a cover moveable relative to the base between a closed position and an open position through an intermediate position between the closed position and the open position; a drive mechanism configured to move the cover from the closed position toward the intermediate position; a retaining mechanism configured to retain the cover in position between the intermediate position and the open position; a composite mechanism comprising a clutch mechanism; and a pivot joint to couple the cover to the base.

The cover may be configured to be moved from the intermediate position to the open position by the vehicle occupant. The cover may be configured to be moved from the open position to the closed position by the vehicle occupant. The drive mechanism may be disengaged by the clutch mechanism. The clutch mechanism may comprise a link on the pivot joint. The clutch mechanism may be configured to retain in position with the base when the cover is moved between the intermediate position and the open position. The clutch mechanism may be configured to engage the drive mechanism to move the cover from the base in movement between the closed position and the intermediate position. The cover may be configured to be moved from the intermediate position to the open position by the vehicle occupant against resistance from the retaining mechanism; the cover may be configured to be moved from the open position to the intermediate position by the vehicle occupant against resistance from the retaining mechanism. The cover may be configured to be moved from the intermediate position to the closed position by the vehicle occupant against resistance from the drive mechanism. The drive mechanism may be engaged to provide a force to move the cover from the closed position to the intermediate position. The drive mechanism may be disengaged by the clutch mechanism when the cover is between the intermediate position and the open position. The component may comprise a latch to retain the cover in the closed position. The drive mechanism may comprise at least one of (a) a spring mechanism or (b) a set of springs or (c) a torsion spring. The retaining mechanism may comprise at least one of (a) friction plates; (b) a set of friction plates; (c) a set of aligned friction plates. The clutch mechanism may be configured to disengage the retaining mechanism in movement between the intermediate position and the closed position.

The present invention relates to a component for a vehicle interior comprising a base; a cover connected with the base through a rotating shaft and configured to rotate between a first position and a third position relative to the base and through a second position between the first position and the third position; a clutch mechanism configured (1) to rotate synchronously with the rotating shaft to rotate the cover from the first position to the second position and/or (2) to keep stationary such that the cover stays at any position between the second position and the third position; and a drive mechanism configured to drive the cover to rotate from the first position to the second position. The clutch mechanism may be configured to retain in position with the base when the cover is moved between the second position and the third position. The clutch mechanism may comprise a link on the rotating shaft. The base may comprise a slot and the clutch mechanism may comprise a pin in the slot and configured to move within the slot as the cover rotates between the first position and the second position. The cover may rotate to the second position when the pin moves to an upper end of the slot. The clutch mechanism may comprise a support plate that may rotate synchronously with the rotating shaft; the pin may be configured to be connected with the support plate and/or the rotating shaft. The support plate may comprise a circular hole; the rotating shaft may comprise a shaft segment matching with the circular hole and having a circular cross section. The base may comprise a stop flange; the cover may be in contact with the stop flange and may be retained in the third position when the cover rotates to the third position. The drive mechanism may be a torsion spring; the torsion spring may be on the base. One end of the torsion spring may be connected with the base and the other end may be under the pin. The cover may have a shaft hole matching with the circular shaft segment; the shaft hole may be formed by the intersection and overlap of two circular holes; the shaft hole may comprise opposing first and third edges and opposing second and fourth edges. Two sides of the circular shaft segment may be in contact with the first edge and the third edge when the cover is located in the first position; two sides of the circular shaft segment may be in contact with the second edge and the fourth edge when the cover is located in the third position.

The present invention relates to a component for a vehicle interior configured to be operated by a vehicle occupant comprising a base; a cover moveable relative to the base between a closed position and an open position through an intermediate position between the closed position and the open position; a drive mechanism configured to move the cover from the closed position toward the intermediate position; and a retaining mechanism configured to retain the cover in position between the intermediate position and the open position. The cover may be configured to be moved from the intermediate position to the open position by the vehicle occupant. The cover may be configured to be moved from the open position to the closed position by the vehicle occupant. The cover may be configured to be moved from the closed position to the intermediate position by the drive mechanism. The component may comprise a latch to retain the cover in the closed position. The cover may be configured to be moved from the intermediate position to the open position by the vehicle occupant against resistance from the retaining mechanism. The cover may be configured to be moved from the open position to the intermediate position by the vehicle occupant against resistance from the retaining mechanism. The cover may be configured to be moved from the intermediate position to the closed position by the vehicle occupant against resistance from the drive mechanism. The cover may be configured to be moved from the intermediate position to the closed position by the vehicle occupant against force from the drive mechanism. The closed position may comprise a latched position. The cover may be configured to be retained in the latched position against force from the drive mechanism. The cover may be configured to be retained in the latched position against force from a spring of the drive mechanism. The component may comprise a clutch mechanism configured to be engaged with the drive mechanism for the cover for movement from the closed position toward the intermediate position and to be engaged with the retaining mechanism for the cover for movement from the intermediate position toward the open position. The clutch mechanism may be configured to disengage the drive mechanism between the cover from the base in movement between the intermediate position and the open position. The clutch mechanism may be configured to rotate in position with the cover when the cover is moved between closed position and the intermediate position. The clutch mechanism may be configured to disengage the retaining mechanism between the cover from the base in movement between the intermediate position and the closed position. The clutch mechanism may be configured to retain in position with the base when the cover is moved between the intermediate position and the open position. The component may comprise a pivot joint configured to couple the cover for rotary movement relative to the base. The pivot joint may comprise at least one of (a) a shaft; (b) a set of posts; (c) a set of pins; (d) a set of axles; (e) a set of bearings; (f) a retainer. The pivot joint may comprise a set of posts configured to engage a set of bearings. The component may comprise a pivot mechanism comprising the pivot joint. The component may comprise a pivot mechanism configured to couple the cover for rotary movement relative to the base. The pivot mechanism may comprise a shaft. The pivot mechanism may comprise a set of posts. The pivot mechanism may comprise a set of posts configured to engage a set of bearings. The pivot mechanism may be configured to engage the retaining mechanism and at least one of the drive mechanism or the clutch mechanism. The pivot mechanism may be configured to engage a clutch mechanism. The component may comprise a cover bracket configured to attach the cover to the base. The component may comprise a base bracket configured to attach the cover to the base. The cover bracket may comprise a plate and a set of arms. The cover bracket may comprise a plate attached to the cover and a set of arms attached to the base bracket. The base bracket may comprise a plate and a set of arms. The base bracket may comprise a plate attached to the base and a set of arms attached to the cover bracket. The cover bracket may be attached to the base bracket by the pivot mechanism. The cover bracket may be attached to the base bracket by the pivot mechanism so that the cover is movable relative to the base. The cover bracket may be coupled to the base bracket by at least one of (a) a pivot joint; (b) a pivot mechanism. The cover bracket may be configured to engage the drive mechanism. The cover bracket may be configured to engage at least one of (a) a spring of the drive mechanism; (b) a torsion spring of the drive mechanism. The drive mechanism may comprise at least one of (a) a spring mechanism; (b) a set of springs; (c) a torsion spring. The drive mechanism may comprise a spring engaged when the cover is between the closed position and the intermediate position. The component may comprise a pivot joint coupling the cover to the base. The drive mechanism may comprise at least one of a spring on the pivot joint; (b) a torsion spring on the pivot joint; (c) a torsion spring on the pivot joint configured to engage the cover and the base; (d) a spring on the pivot joint configured to provide a force to move the cover from the closed position toward the intermediate position; (e) a torsion spring on the pivot joint configured to be compressed when the cover is moved to the closed position and provide a force to move the cover from the closed position toward the intermediate position. The drive mechanism may be engaged to provide a force when the cover is between the closed position and the intermediate position. The drive mechanism may be engaged to provide a force to move the cover from the closed position to the intermediate position. The drive mechanism may be engaged to provide a force to resist movement of the cover from the intermediate position to the closed position. The drive mechanism may be disengaged when the cover is between the intermediate position and the open position. The drive mechanism may be disengaged by the clutch mechanism. The clutch mechanism may be configured to disengage the drive mechanism between the cover from the base. The retaining mechanism may comprise at least one of (a) friction plates; (b) a set of friction plates; (c) a set of aligned friction plates. The retaining mechanism may be engaged with a pivot joint between the cover and the base. The pivot joint may comprise a shaft; the retaining mechanism may comprise friction plates on the shaft. The retaining mechanism may comprise a set of friction plates engaged when the cover is between the intermediate position and the open position. The retaining mechanism may be engaged when the cover is between the intermediate position and the open position. The retaining mechanism may be disengaged when the cover is between the closed position and the intermediate position. The retaining mechanism may be disengaged by the clutch mechanism. The clutch mechanism may be configured to disengage the retaining mechanism between the cover from the base. Disengagement of the retaining mechanism may comprise disengagement of friction plates. Engagement of the retaining mechanism may comprise engagement of friction plates. The retaining mechanism may be configured to provide resistance to movement of the cover between the intermediate position and the open position. The retaining mechanism may be configured to retain position of the cover between the intermediate position and the open position. The component may comprise a composite mechanism comprising the drive mechanism and the retaining mechanism. The component may comprise a composite mechanism comprising a link. The link may comprise a body and a pin and stop and an aperture. The component may comprise a composite mechanism comprising a clutch mechanism. The clutch mechanism may comprise the link. The component may comprise a composite mechanism comprising a clutch mechanism; The clutch mechanism may comprise the link. The component may comprise a link movable with the cover. The component may comprise a link on the pivot joint. The component may comprise a link comprising a body and a pin and a stop and an aperture configured to engage the pivot joint. The aperture may comprise at least one of (a) a slot; (b) a hole. The aperture may be configured to engage an engagement element. The aperture may comprise a set of edges configured to engage the engagement element. The body may comprise at least one of (a) a plate; (b) a plate surface; (c) a flat surface; (d) a flange; (e) the aperture. The body may comprise a surface configured to engage with the retaining mechanism. The body may comprise a surface configured to engage with the retaining mechanism when the cover is between the intermediate position and the open position. The body may comprise a surface configured to engage with friction plates of the retaining mechanism. The body may comprise a plate surface configured to engage with friction plates of the retaining mechanism. The body may be configured to engage the retaining mechanism. The body may be aligned with friction plates of the retaining mechanism. The stop may comprise at least one of (a) a projection; (b) a flange; (c) a stop flange. The stop may be configured to engage with the base. The stop may be configured to engage with a base bracket of the base. The stop may be configured to engage when the cover is moved to a fully-open position. The open position may comprise a fully-open position when the stop is engaged with the cover. The stop is configured to define the fully-open position. The pin may be configured to at least one of (a) engage with the base; (b) engage with a base bracket of the base; (c) fit within a slot of a base bracket of the base; (d) fit within a slot for the base. The pin may be configured to move within the slot when the cover is moved between the closed position and the intermediate position. The link may be configured to be retained to the base when the pin moves in the slot as the cover moves between the open position and the intermediate position. The pin may be configured to be retained in position relative to the slot when the cover is in the intermediate position. The pin is engaged within the slot when the cover is moved from the closed position to the intermediate position. The pin is within the slot when the cover is moved from the intermediate position to the open position. The pin may be disengaged for movement within the slot when the cover is moved between the open position and intermediate position. The link may be configured to move in position with the cover when the pin is engaged within the slot. The link may be configured to retain in position with the base when the pin is within the slot. The slot may comprise a slot length; The slot length defines the intermediate position of the cover. The slot length provides a stop for the pin. The pin may be configured to engage the drive mechanism. The pin may be configured to engage a spring of the drive mechanism. The pin may be configured to engage a torsion spring of the drive mechanism. The component may comprise a composite mechanism comprising a pivot joint to couple the cover to the base. The composite mechanism may comprise a hinge mechanism. The hinge mechanism may a pivot joint to couple the cover to the base. The hinge mechanism may comprise the drive mechanism and the retaining mechanism. The hinge mechanism may comprise a clutch mechanism.

The present invention relates to a component for a vehicle interior configured to be operated by a vehicle occupant comprising a base; a cover moveable relative to the base between a closed position and an open position through an intermediate position between the closed position and the open position; and a composite mechanism comprising a drive mechanism and a retaining mechanism and a link. The drive mechanism may be configured to move the cover from the closed position toward the intermediate position. The retaining mechanism may be configured to retain the cover in position between the intermediate position and the open position. The link may be configured to be engaged with the drive mechanism for the cover for movement from the closed position toward the intermediate position and to be disengaged with the drive mechanism for the cover for movement from the intermediate position toward the open position. The cover may be configured to be moved from the intermediate position to the open position by the vehicle occupant. The cover may be configured to be moved from the open position to the closed position by the vehicle occupant. The link may comprise a body and a pin and stop and an aperture. The aperture may comprise a slot. The aperture may be configured to engage an engagement element. The aperture may comprise a set of edges configured to engage the engagement element. The body may comprise a plate. The body may comprise a surface configured to engage with the retaining mechanism. The body may comprise a surface configured to engage with the retaining mechanism when the cover is between the intermediate position and the open position. The body may comprise a surface configured to engage with friction plates of the retaining mechanism. The stop may comprise a projection. The stop may be configured to engage with the base. The stop may be configured to engage with a base bracket of the base. The open position may comprise a fully-open position when the stop is engaged with the base. The stop and base are configured to define the fully-open position. The pin may be configured to engage with the base. The pin may be configured to engage with a base bracket of the base. The pin may be configured to fit within a slot for the base. The pin may be configured to move within the slot when the cover is moved between the closed position and the intermediate position. The pin may be within the slot when the cover is moved from the intermediate position to the open position. The pin is within the slot when the cover is moved between the open position and intermediate position. The slot may comprise a slot length; The slot length defines the intermediate position of the cover. The slot length provides a stop for the pin. The pin may be configured to engage the drive mechanism. The pin may be configured to engage a spring of the drive mechanism.

The present invention relates to a component for a vehicle interior configured to be operated by a vehicle occupant comprising a base; a cover moveable relative to the base between a closed position and an open position through an intermediate position between the closed position and the open position; a drive mechanism configured to move the cover from the closed position toward the intermediate position; a retaining mechanism configured to retain the cover in position between the intermediate position and the open position; and a link configured to be engaged with the drive mechanism for the cover for movement from the closed position toward the intermediate position and to be engaged with the retaining mechanism for the cover for movement from the intermediate position toward the open position. The cover may be configured to be moved from the intermediate position to the open position by the vehicle occupant. The cover may be configured to be moved from the open position to the closed position by the vehicle occupant. The component may comprise a clutch mechanism comprising the link. The component may comprise a pivot joint to couple the cover to the base. The link may comprise a body and a pin and a stop and an aperture configured to engage the pivot joint.

The present invention relates to a component for a vehicle interior configured to be operated by a vehicle occupant comprising a base; a cover moveable relative to the base between a closed position and an open position through an intermediate position between the closed position and the open position; a drive mechanism configured to move the cover from the closed position toward the intermediate position; a retaining mechanism configured to retain the cover in position between the intermediate position and the open position; and a clutch mechanism configured to be engaged with the drive mechanism for the cover for movement from the closed position toward the intermediate position and to be engaged with the retaining mechanism for the cover for movement from the intermediate position toward the open position. The cover may be configured to be moved from the intermediate position to the open position by the vehicle occupant. The cover may be configured to be moved from the open position to the closed position by the vehicle occupant. The clutch mechanism may be engaged for movement of the cover between the closed position and the intermediate position and engaged with the retaining mechanism for movement of the cover between the intermediate position and the open position. The cover may be configured to be moved from the closed position to the intermediate position by the drive mechanism. The component may comprise a latch to retain the cover in the closed position. The component may comprise a cover bracket configured to attach the cover to the base. The component may comprise a base bracket configured to attach the cover to the base. The cover bracket may comprise a plate attached to the cover and a set of arms attached to the base bracket. The base bracket may comprise a plate attached to the base and a set of arms attached to the cover bracket. The cover bracket may be coupled to the base bracket at a pivot joint between the cover and the base.

The present invention relates to a component for a vehicle interior configured to be operated by a vehicle occupant comprising a base; a pivot joint; a cover moveable relative to the base at the pivot joint between a closed position and an open position through an intermediate position between the closed position and the open position; a drive mechanism configured to move the cover from the closed position toward the intermediate position; a retaining mechanism configured to retain the cover in position between the intermediate position and the open position; and a clutch mechanism configured to be engaged with the drive mechanism for the cover for movement from the closed position toward the intermediate position and to be engaged with the retaining mechanism for the cover for movement from the intermediate position toward the open position. The cover may be configured to be moved from the intermediate position to the open position by the vehicle occupant. The cover may be configured to be moved from the open position to the closed position by the vehicle occupant. The component may comprise a pivot mechanism comprising the pivot joint. The pivot mechanism may comprise a shaft. The pivot mechanism may comprise a set of posts. The pivot mechanism may comprise a set of posts configured to engage a set of bearings. The pivot mechanism may be configured to engage the retaining mechanism and at least one of the drive mechanism or the clutch mechanism. The pivot mechanism may be configured to engage a clutch mechanism. The component may comprise a cover bracket configured to attach the cover to the base. The component may comprise a base bracket configured to attach the cover to the base. The cover bracket may comprise a plate attached to the cover and a set of arms attached to the base bracket. The base bracket may comprise a plate attached to the base and a set of arms attached to the cover bracket. The cover bracket may be coupled to the base bracket by the pivot joint. The cover bracket may be configured to engage the drive mechanism. The cover bracket may be configured to engage a spring mechanism of the drive mechanism. The component may comprise a link comprising a body and a pin and a stop and an aperture configured to engage the pivot joint.

The present invention relates to a component for a vehicle interior comprising a base; a cover rotatably connected with the base and configured to rotate between a first position and a third position relative to the base and through a second position between the first position and the third position; and a drive mechanism configured to drive the cover to rotate from the first position to the second position. The cover may be configured to rotate between the second position and the third position in response to a force applied to the cover by a hand. The cover may be configured to be retained at any position between the second position and the third position. The component may comprise at least one clutch mechanism; the clutch mechanism may be configured for the coupling and uncoupling of the cover and the drive mechanism. The drive mechanism drives the clutch mechanism to rotate the cover from the first position to the second position. The clutch mechanism may be restricted by the base against a driving force of the drive mechanism on the cover when the cover rotates from the second position to the third position. The cover may be configured to rotate from the second position to the first position in response to a force applied to the cover by a hand. The base may comprise a storage compartment; the storage compartment may be covered by the cover when the cover is in the first position. The drive mechanism may comprise at least one of a spring, a torsion spring, a coil spring, a compression spring, a motor, or an air support.

The present invention relates to a component for a vehicle interior comprising a base; a cover connected with the base through a rotating shaft and configured to rotates between a first position and a third position relative to the base and through a second position between the first position and the second position; and a clutch mechanism configured (1) to rotate synchronously with the rotating shaft to rotate the cover from the first position to the second position and/or (2) to keep stationary such that the cover stays at any position between the second position and the third position. The component may comprise a drive mechanism configured to drive the cover to rotate from the first position to the second position. The base may comprise a slot and the clutch mechanism may comprise a pin in the slot and configured to move within the slot as the cover rotates between the first position and the second position. The cover rotates to the second position when the pin moves to upper end of the slot. The clutch mechanism comprising a support plate that rotates synchronously with the rotating shaft; the pin may be configured to be connected with the support plate and/or the rotating shaft. The support plate may comprise a circular hole; the rotating shaft may comprise a shaft segment matching with the circular hole and having a circular cross section. The base may comprise a stop flange; the cover may be in contact with the stop flange and retained in the third position when the cover rotates to the third position. The drive mechanism may comprise a torsion spring; the torsion spring may be on the base. One end of the torsion spring may be connected with the base and the other end may be under the pin. The cover may comprise a shaft hole matching with the circular shaft segment; the shaft hole may be formed by the intersection and overlap of two circular holes; the shaft hole may comprise opposing first and third edges and opposing second and fourth edges. Two sides of the circular shaft segment are in contact with the first edge and the third edge when the cover is located in the first position; two sides of the circular shaft segment are in contact with the second edge and the fourth edge when the cover is located in the third position. The component may comprise a turnover mechanism.

The present invention relates to a turnover mechanism comprising a base, a cover rotatably connected with the base and configured to rotate between a first position and a third position relative to the base during which the cover passes through a second position; a driving mechanism configured for driving the cover to rotate from the first position to the second position. The cover may rotate between the second position and the third position in response to a force applied to the cover by a hand; may stay at any position between the second position and the third position. The turnover mechanism may comprise at least one clutch mechanism configured for the coupling and uncoupling of the cover and the driving mechanism. The driving mechanism may drive the clutch mechanism to rotate the cover from the first position to the second position. The clutch mechanism may be restricted by the base against a driving force of the driving mechanism on the cover when the cover rotates from the second position to the third position. The cover may rotate from the second position to the first position in response to a force applied to the cover by a hand. The base may comprise a storage compartment. The storage compartment may be covered by the cover when the cover is located in the first position. The driving mechanism may comprise a spring, a torsion spring, a coil spring, a compression spring, a motor, or an air support.

The present invention relates to a turnover mechanism comprising a base and a cover connected with the base through a rotating shaft. The cover may rotate between a first position and a third position relative to the base, during which the cover passes through a second position. The turnover mechanism may comprise a clutch mechanism configured to: (1) rotate synchronously with the rotating shaft to rotate the cover from the first position to the second position; and/or, (2) keep stationary such that the cover stays at any position between the second position and the third position. The turnover mechanism may comprise a driving mechanism configured to drive the cover to rotate from the first position to the second position. The base may comprise a long hole; the clutch mechanism may comprise a pin that passes through the long hole and moves within the long hole as the cover rotates between the first position and the second position. The cover may rotate to the second position when the pin moves to upper end of the long hole. The clutch mechanism may comprise a support plate that rotates synchronously with the rotating shaft; the pin may be configured to be connected with any one of the support plate and the rotating shaft. The support plate may comprise a waist circular hole; the rotating shaft may comprise a shaft segment matching with the waist circular hole and having a waist circular cross section. The base may comprise a stop flange; the cover may be in contact with the stop flange and retained in the third position when the cover rotates to the third position. The driving mechanism may comprise a torsion spring; the torsion spring may be disposed on the base. One end of the torsion spring may be connected with the base; the other end may be pressed under the pin. The cover may comprise a shaft hole matching with the waist circular shaft segment; the shaft hole may be formed by the intersection and overlap of two waist circular holes and may comprise two sets of opposing first and third edges; second and fourth edges. Two sides of the waist circular shaft segment may be in contact with the first edge and the third edge, respectively, when the cover is located in the first position. Two sides of the waist circular shaft segment may be in contact with the second edge and the fourth edge, respectively, when the cover is located in the third position.

FIGURES

DESCRIPTION

Figure 1A:
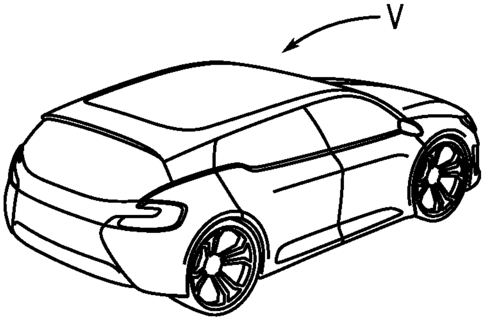
FIGS. 1A and 1B are schematic perspective views of a vehicle according to an exemplary embodiment.
Figure 1B:
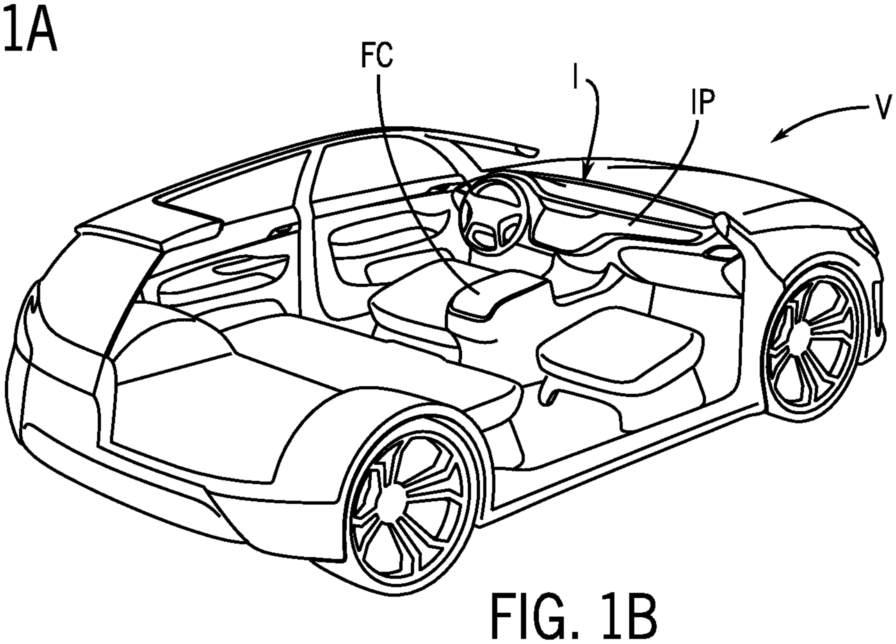
Figure 2:
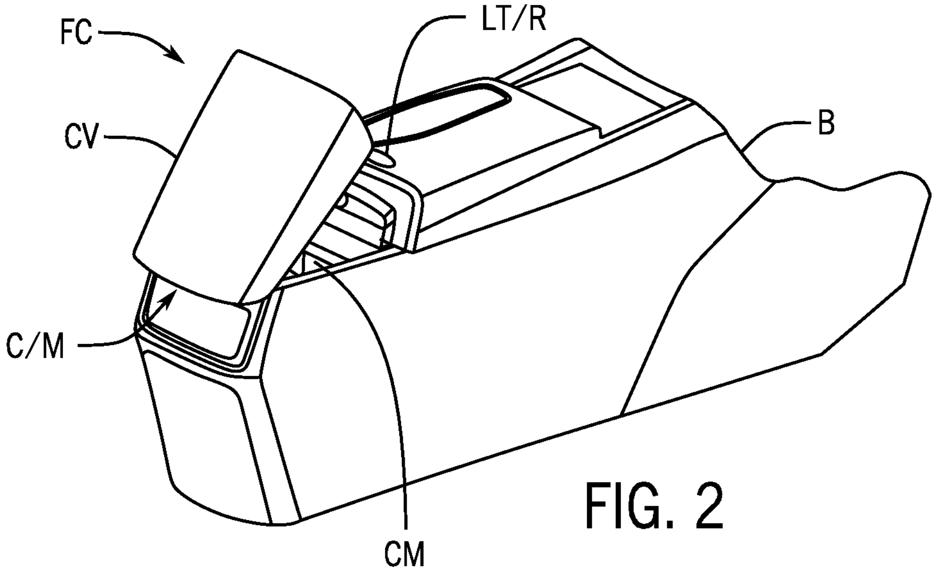
FIG. 2 is a schematic perspective view of a component for a vehicle interior.

According to an exemplary embodiment shown schematically in FIGS. 1A-1B and 2, a vehicle V may comprise an interior I with a component C/M shown as a floor console FC (e.g. providing a storage compartment, armrest, etc.) and an instrument panel IP.

Figure 2A:
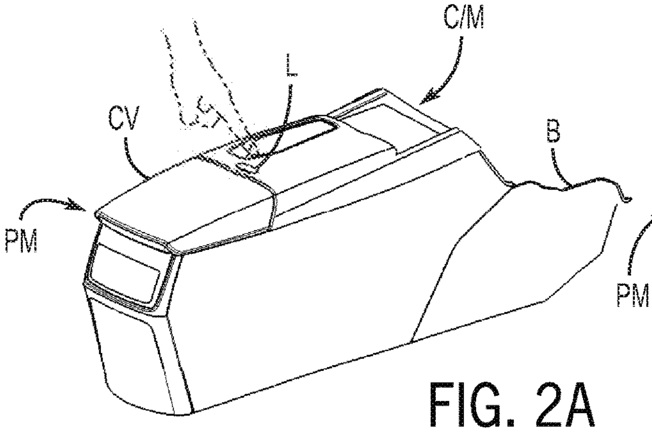
FIGS. 2A through 2H are schematic perspective views of a component for a vehicle interior comprising the hinge/pivot mechanism according to an exemplary embodiment.
Figure 2B:
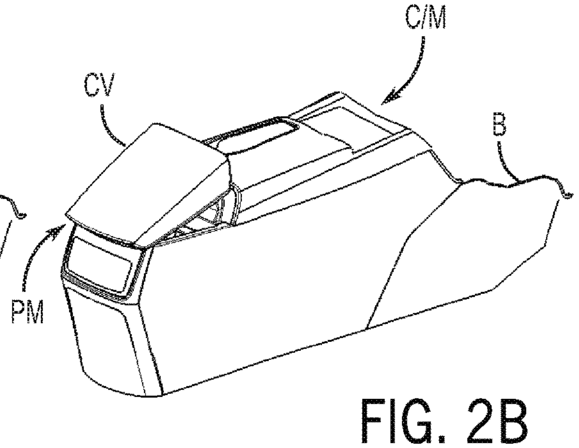

According to an exemplary embodiment shown schematically in FIGS. 2, 2A-2H and 3A-3F, the component C/M shown as floor console FC may comprise a base B and a cover CV moveable relative to the base between a closed position (FIGS. 2A, 2H, 3D and 3F) and an open position (FIGS. 2H and 3E) through an intermediate position (FIGS. 2B-2C) between the closed position and the open position (FIGS. 2D-2F and 3B-3C). As shown schematically in FIGS. 2 and 2A-2H, the component C/M with base B may comprise a compartment CM; the cover CV may be secured to the base B by a latch/release mechanism LT/R shown as configured to be actuated by a button L (e.g. for a spring-release latch).

According to an exemplary embodiment shown schematically in FIGS. 2, 2A-2H, 3A-3F and 4A-4B, the component C/M may comprise a composite/hinge mechanism shown as a pivot mechanism PM providing a pivot joint PM to couple the cover CV for pivoting/rotating movement relative to the base B; the composite/hinge mechanism PM may comprise a drive mechanism DM configured to move the cover CV from the closed position toward the intermediate position; and a retaining mechanism RM configured to retain the cover in position between the intermediate position and the open position. See also TABLE A.

As shown schematically in FIGS. 2A-2H and 3A-3F and TABLE A, the cover CV may be configured to be moved from the intermediate position to the open position by the vehicle occupant; the cover CV may be configured to be moved from the open position to the closed position by the vehicle occupant; the cover CV may be configured to be moved from the closed position to the intermediate position by the drive mechanism DM. The latch mechanism LT/R may be configured to retain the cover CV in the closed position. The cover CV may be configured to be moved from the intermediate position to the open position by the vehicle occupant against resistance from the retaining mechanism; the cover CV may be configured to be moved from the open position to the intermediate position by the vehicle occupant against resistance from the retaining mechanism RM; the cover CV may be configured to be moved from the intermediate position to the closed position by the vehicle occupant against resistance from the drive mechanism DM; the cover CV may be configured to be moved from the intermediate position to the closed position by the vehicle occupant against force from the drive mechanism DM.

As indicated schematically in FIGS. 2, 2A-2H, 3A-3F and 4A-4B, the closed position may comprise a latched position; the cover CV may be configured to be retained in the latched position against force from the drive mechanism DM; the cover CV may be configured to be retained in the latched position against force from a spring such as torsion spring TS of the drive mechanism DM. As shown schematically in FIGS. 4A-4B, the component C/M may comprise a clutch mechanism CM configured to be engaged with the drive mechanism DM for the cover CV for movement from the closed position toward the intermediate position and to be engaged with the retaining mechanism RM for the cover CV for movement from the intermediate position toward the open position.

According to an exemplary embodiment shown schematically in FIGS. 2A-2H and 3A-3F and TABLE A, the cover is movable relative to the base from the closed position toward the intermediate position by a drive mechanism; the cover is retained by a retaining mechanism and/or movable between the intermediate position and the open position by manual/hand action; the cover is retained by a retaining mechanism and/or movable from the open position toward the closed position by manual/hand action.

TABLE A

OPERATION OF COVER AND COMPOSITE HINGE/PIVOT MECHANISM

| POSITION | MOVEMENT | LATCH | DRIVE MECHANISM | RETAINING MECHANISM |
|---|---|---|---|---|
| Closed | N/A | Engaged | Engaged (Opposed) | Disengaged |

TABLE A-continued

| OPERATION OF COVER AND COMPOSITE HINGE/PIVOT MECHANISM | | | | |
|---|---|---|---|---|
| POSITION | MOVEMENT | LATCH | DRIVE MECHANISM | RETAINING MECHANISM |
| Closed | Toward Intermediate (Driven) | Disengaged | Engaged | Disengaged |
| Between Closed And Intermediate | Toward Intermediate (Driven) | N/A | Engaged | Disengaged |
| Intermediate | Toward Open (Manual) | N/A | N/A | Engaged |
| Intermediate | N/A | N/A | N/A | Engaged |
| Between Intermediate and Open | Toward Open (Manual) | N/A | N/A | Engaged |
| Between Intermediate and Open | N/A | N/A | N/A | Engaged |
| Open | N/A | N/A | N/A | Engaged |
| Between Open And Intermediate | Toward Intermediate (Manual) | N/A | N/A | Engaged |
| Between Open And Intermediate | N/A | N/A | N/A | Engaged |
| Intermediate | Toward Closed (Manual) | N/A | N/A | Engaged |
| Intermediate | N/A | N/A | N/A | Engaged |
| Between Intermediate And Closed | Toward Closed (Manual) | N/A | Engaged (Opposed) | Disengaged |
| Closed | N/A | Engaged | Engaged (Opposed) | Disengaged |

According to an exemplary embodiment shown schematically in FIGS. 2A-2H, 4A-4B, 5, 6, 7 and 8A-8B, the component C/M may comprise a base bracket BB for the base B and a cover bracket CB for the cover CV coupled at a pivot joint JT of a pivot mechanism PM for rotation at a set of pivot posts PP; the pivot mechanism PM may comprise a drive mechanism DM comprising a set of torsion springs TS on a shaft SF and a retaining mechanism RM comprising a set of friction plates FP on each side of a projection/arm of cover bracket CB and a clutch mechanism CM operating at a link LK with a body BD and an aperture AP and a pin PN and a stop ST; the pin PN of the link LK extends through a slot SL in the base bracket BB; the set of pivot posts PP secures the cover bracket CB to the base bracket BB with a ring washer WR (and/or gasket ring) and the link LK and friction plates FP and an end cap EC; the torsion spring TS for the drive mechanism is engaged at one end to a recess within the base bracket BB and at the other end on pin PN configured to extend through an opening in the base bracket BB; torsion spring TS when installed on shaft SF will provide a force for mechanical movement of the cover CV relative to the base from the open position to intermediate position and to the cover mechanism. See also FIGS. 16A-16D and 20O and TABLE A.

According to an exemplary embodiment shown schematically in FIGS. 17A-17C and 18A-18D, the component C/M may comprise a base bracket BB for the base B and a cover bracket CB for the cover CV coupled at a pivot joint JT of a pivot mechanism PM for rotation at a set of pivot posts PP; the pivot mechanism PM may comprise a drive mechanism DM comprising a set of torsion springs TS on a shaft SF and a retaining mechanism RM comprising a set of friction plates FP on each side of a projection/arm of cover bracket CB and a clutch mechanism CM operating at a link LK with a body BD and an aperture AP and a pin PN and a stop ST; the pin PN of the link LK extends through a slot SL in the base bracket BB; the set of pivot posts PP secures the cover bracket CB to the base bracket BB with a ring washer WR (and/or gasket ring) and the link LK and friction plates FP and an end cap EC (e.g. star washer/retainer); the torsion spring TS for the drive mechanism is engaged at one end to a recess within the base bracket BB and at the other end on pin PN; torsion spring TS when installed on shaft SF will provide a force for mechanical movement of the cover CV relative to the base from the open position to intermediate position and to the cover mechanism. As indicated schematically in FIGS. 18A-18D, the component C/M with hinge/pivot mechanism is configured to move between an open position (FIG. 18A) with the retaining mechanism RM engaged to retain position and pin PN at end of slot SL and stop flange FL engaged to a position (FIG. 18B) with the retaining mechanism RM engaged to retain position and pin PN at the terminal end of slot SL toward an intermediate position (FIG. 18C) with the retaining mechanism RM engaged to retain position and pin PN at end of slot SL toward the closed position (FIG. 18D) with the retaining mechanism RM disengaged and pin PN at initial end of slot SL and drive mechanism engaged through torsion spring TS compressed and acting to move toward the intermediate position. See also TABLE A.

According to an exemplary embodiment shown schematically in FIGS. 2, 2A-2H and 19A-19D, the component C/M may comprise a base bracket BB for the base B and a cover bracket CB for the cover CV coupled at a pivot joint JT of a pivot mechanism PM for rotation at a set of pivot posts PP; the pivot mechanism PM may comprise a drive mechanism DM comprising a set of torsion springs TS and a retaining mechanism RM comprising a set of friction plates FP on each side of a projection/arm of cover bracket CB and a clutch mechanism CM operating through a ring washers WRx and gasket/ring washer WR; a link LKz on pivot post PP comprises a body BDz and flange/stop STz; the cover bracket CB is secured to the base bracket BB on the friction plates FP by an end cap EC (e.g. star washer/retainer); the torsion spring TS for the drive mechanism is engaged at one end in a recess within the base bracket BB and at the other end on flange/stop STz; torsion spring TS will provide a force for mechanical movement of the cover CV relative to the base from the open position to intermediate position and to the cover mechanism. See also FIGS. 16A-16D and TABLE A.

Exemplary Embodiments—A

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, a component/mechanism C/M for a vehicle interior configured to be operated by a vehicle occupant comprising a base B; a cover CV moveable relative to the base B between a closed position and an open position through an intermediate position between the closed position and the open position; a drive mechanism DM configured to move the cover CV from the closed position toward the intermediate position;

and a retaining mechanism RM configured to retain the cover CV in position between the intermediate position and the open position; the cover CV may be configured to be moved from the intermediate position to the open position by the vehicle occupant; the cover CV may be configured to be moved from the open position to the closed position by the vehicle occupant; the cover CV may be configured to be moved from the closed position to the intermediate position by the drive mechanism DM; the component C may comprise a latch to retain the cover CV in the closed position; the closed position may comprise a latched position; the cover CV may be configured to be retained in the latched position against force from the drive mechanism DM; the cover CV may be configured to be retained in the latched position against force from a spring of the drive mechanism DM. See also TABLE A and TABLE B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a clutch mechanism CM configured to be engaged with the cover CV for movement from the closed position toward the intermediate position and to be disengaged with the drive mechanism DM for the cover CV for movement from the intermediate position toward the open position; the clutch mechanism CM may be configured to engage the retaining mechanism RM between the cover CV from the base B in movement between the intermediate position and the open position; the clutch mechanism CM may be configured to rotate in position with the cover CV when the cover CV is moved between closed position and the intermediate position; the clutch mechanism CM may be configured to disengage the retaining mechanism RM between the cover CV from the base B in movement between the intermediate position and the closed position; the clutch mechanism CM may be configured to retain in position with the base B when the cover CV is moved between the intermediate position and the open position.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a pivot joint PJ configured to couple the cover CV for rotary movement relative to the base B; the pivot joint PJ may comprise at least one of a shaft; a set of posts; a set of pins; a set of axles; a set of bearings; (f) a retainer; the pivot joint PJ may comprise a set of posts configured to engage a set of bearings; the component C may comprise a pivot/hinge mechanism PM comprising the pivot joint PJ; the component C may comprise a pivot/hinge mechanism PM configured to couple the cover CV for rotary movement relative to the base B; the pivot/hinge mechanism PM may comprise a shaft SF; the pivot/hinge mechanism PM may comprise a set of posts; the pivot/hinge mechanism PM may comprise a set of posts configured to engage a set of bearings; the pivot/hinge mechanism PM may be configured to engage the retaining mechanism RM and at least one of the drive mechanism DM or the clutch mechanism CM; the pivot/hinge mechanism PM may be configured to engage a clutch mechanism CM. See also TABLE A and TABLE B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a cover bracket CB configured to attach the cover CV to the base B; the component C may comprise a base bracket BB configured to attach the cover CV to the base B; the cover bracket CB may comprise a plate and a set of arms; the cover bracket CB may comprise a plate attached to the cover CV and a set of arms attached to the base bracket BB; the base bracket BB may comprise a plate and a set of arms; the base bracket BB may comprise a plate attached to the base B and a set of arms attached to the cover bracket CB; the cover bracket CB may be attached to the base bracket BB by the pivot/hinge mechanism PM; the cover bracket CB may be attached to the base bracket BB by the pivot/hinge mechanism PM so that the cover CV is movable relative to the base B; the cover bracket CB may be coupled to the base bracket BB by at least one of a pivot joint PJ; a pivot/hinge mechanism PM; the cover bracket CB may be configured to engage the drive mechanism DM; the cover bracket CB may be configured to engage at least one of a spring of the drive mechanism DM; a torsion spring TS of the drive mechanism DM; the drive mechanism DM may comprise at least one of a spring mechanism; a set of springs; a torsion spring TS; the drive mechanism DM may comprise a spring engaged when the cover CV is between the closed position and the intermediate position; the component C may comprise a pivot joint PJ coupling the cover CV to the base B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the drive mechanism DM may comprise at least one of a spring on the pivot joint PJ; a torsion spring TS on the pivot joint PJ; a torsion spring TS on the pivot joint PJ configured to engage the cover CV and the base B; a spring on the pivot joint PJ configured to provide a force to move the cover CV from the closed position toward the intermediate position; a torsion spring TS on the pivot joint PJ configured to be compressed when the cover CV is moved to the closed position and provide a force to move the cover CV from the closed position toward the intermediate position; the drive mechanism DM may be engaged to provide a force when the cover CV is between the closed position and the intermediate position; the drive mechanism DM may be engaged to provide a force to move the cover CV from the closed position to the intermediate position; the drive mechanism DM may be engaged to provide a force to resist movement of the cover CV from the intermediate position to the closed position; the retaining mechanism RM may be engaged when the cover CV is between the intermediate position and the open position; the drive mechanism DM may be engaged by the clutch mechanism CM; the clutch mechanism CM may be configured to engage the drive mechanism DM between the cover CV from the base B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the retaining mechanism RM may comprise at least one of friction plates FP; a set of friction plates FP; a set of aligned friction plates FP; the retaining mechanism RM may be engaged with a pivot joint PJ between the cover CV and the base B; the pivot joint PJ may comprise a shaft SF; the retaining mechanism RM may comprise friction plates FP on the shaft SF; the retaining mechanism RM may comprise a set of friction plates FP engaged when the cover CV is between the intermediate position and the open position; the retaining mechanism RM may be engaged when the cover CV is between the intermediate position and the open position; the retaining mechanism RM may be disengaged when the cover CV is between the closed position and the intermediate position; the retaining mechanism RM may be disengaged by the clutch mechanism CM; the clutch mechanism CM may be configured to disengage the retaining mechanism RM between the cover CV from the base B.

Disengagement of the retaining mechanism RM may comprise disengagement of friction plates FP. Engagement of the retaining mechanism RM may comprise engagement of friction plates FP; the retaining mechanism RM may be configured to provide resistance to movement of the cover CV between the intermediate position and the open position; the retaining mechanism RM may be configured to retain position of the cover CV between the intermediate position and the open position; the component C may comprise a composite mechanism comprising the drive mechanism DM and the retaining mechanism RM. See also TABLE A and TABLE B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a composite mechanism comprising a link; the link LK may comprise a body BD and a pin PN and stop ST and an aperture AP; the component C may comprise a composite mechanism comprising a clutch mechanism CM; the clutch mechanism CM may comprise the link; the component C may comprise a composite mechanism comprising a clutch mechanism CM; The clutch mechanism CM may comprise the link.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a link movable with the cover CV; the component C may comprise a link on the pivot joint PJ; the component C may comprise a link LK comprising a body BD and a pin PN and a stop ST and an aperture AP configured to engage the pivot joint PJ; the aperture AP may comprise a slot SL or a hole; the aperture AP may be configured to engage an engagement element; the aperture may comprise a set of edges configured to engage the engagement element; the body BD may comprise at least one of a plate, a plate surface, a flat surface a flange and/or an aperture; the body BD may comprise a surface configured to engage with the retaining mechanism RM; the body BD may comprise a surface configured to engage with the retaining mechanism RM when the cover CV is between the intermediate position and the open position; the body BD may comprise a surface configured to engage with friction plates FP of the retaining mechanism RM; the body BD may comprise a plate surface configured to engage with friction plates FP of the retaining mechanism RM; the body BD may be configured to engage the retaining mechanism RM; the body BD may be aligned with friction plates FP of the retaining mechanism RM; the stop ST may comprise at least one of a projection; a flange; a stop ST flange; the stop ST may be configured to engage with the base B; the stop ST may be configured to engage with a base bracket BB of the base B; the pin PN may be configured to at least one of engage with the base B; engage with a base bracket BB of the base B; fit within a slot SL of a base bracket BB of the base B; fit within a slot SL for the base B; the pin PN may be configured to move within the slot SL when the cover CV is moved between the closed position and the intermediate position; the link may be configured to be retained to the base B when the pin PN moves in the slot SL as the cover CV moves between the open position and the intermediate position; the pin PN may be configured to be retained in position relative to the slot SL when the cover CV is in the intermediate position; the pin PN is engaged with the slot SL when the cover CV is moved from the closed position to the intermediate position; the pin PN may be within the slot SL when the cover CV is moved from the intermediate position to the open position; the pin PN may be disengaged for movement within the slot SL when the cover CV is moved between the open position and intermediate position; the link may be configured to move in position with the cover CV when the pin PN is engaged with the slot SL; the link may be configured to retain in position with the base B when the pin PN is disengaged within the slot SL; the slot SL may comprise a slot SL length; The slot SL length defines the intermediate position of the cover CV; the slot SL length provides a stop ST for the pin PN; the pin PN may be configured to engage the drive mechanism DM; the pin PN may be configured to engage a spring of the drive mechanism DM; the pin PN may be configured to engage a torsion spring TS of the drive mechanism DM.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, a component/mechanism C/M for a vehicle interior configured to be operated by a vehicle occupant comprising a base B; a cover CV moveable relative to the base B between a closed position and an open position through an intermediate position between the closed position and the open position; and a composite mechanism comprising a drive mechanism DM and a retaining mechanism RM and a link LK; the drive mechanism DM may be configured to move the cover CV from the closed position toward the intermediate position; the retaining mechanism RM may be configured to retain the cover CV in position between the intermediate position and the open position; the link may be configured to be engaged with the cover CV for movement from the closed position toward the intermediate position and to be disengaged with the cover CV for movement from the intermediate position toward the open position; the cover CV may be configured to be moved from the intermediate position to the open position by the vehicle occupant; the cover CV may be configured to be moved from the open position to the closed position by the vehicle occupant. See also TABLE A. A stop flange FL may be configured to engage when the cover CV is moved to a fully-open position; the open position may comprise a fully-open position when the stop flange FL is engaged with the base B; the stop flange FL may be configured to define the fully-open position. See FIG. 17C.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the link LK may comprise a body BD and a pin PN and stop ST and an aperture AP; the aperture AP may comprise a slot SL; the aperture AP may be configured to engage an engagement element; the aperture AP may comprise a set of edges configured to engage the engagement element; the body BD may comprise a plate; the body BD may comprise a surface configured to engage with the retaining mechanism RM; the body BD may comprise a surface configured to engage with the retaining mechanism RM when the cover CV is between the intermediate position and the open position; the body BD may comprise a surface configured to engage with friction plates FP of the retaining mechanism RM; the stop ST may comprise a projection; the stop ST may be configured to engage with the base B; the stop ST may be configured to engage with a base bracket BB of the base B; the open position may comprise a fully-open position when the stop ST is engaged with the base B; the stop ST and base B are configured to define the fully-open position; the pin PN may be configured to engage with the base B; the pin PN may be configured to engage with a base bracket BB of the base B; the pin PN may be configured to fit within a slot SL for the base B; the pin PN may be configured to move within the slot SL when the cover CV is moved between the closed position and the intermediate position; the pin PN is within the slot SL when the cover CV is moved from the intermediate position to the open position; the pin PN may be within the slot SL when the cover CV is moved between the open position and intermediate position; the slot SL may comprise a slot SL length; The slot SL length defines the intermediate position of the cover CV; the slot SL length provides a stop ST for the pin PN; the pin PN may be configured to engage the drive mechanism DM; the pin PN may be configured to engage a spring of the drive mechanism DM. See also TABLE A.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, a component/mechanism C/M for a vehicle interior configured to be operated by a vehicle occupant comprising a base B; a cover CV moveable relative to the base B between a closed position and an open position through an intermediate position between the closed position and the open position and a drive mechanism DM configured to move the cover CV from the closed position toward the intermediate position and a retaining mechanism RM configured to retain the cover CV in position between the intermediate position and the open position and a link configured to be engaged with the cover CV for movement from the closed position toward the intermediate position and to be disengaged with the cover CV for movement from the intermediate position toward the open position; the cover CV may be configured to be moved from the intermediate position to the open position by the vehicle occupant; the cover CV may be configured to be moved from the open position to the closed position by the vehicle occupant; the component C may comprise a clutch mechanism CM comprising the link; the component C may comprise a pivot joint PJ to couple the cover CV to the base B; the link LK may comprise a body BD and a pin PN and a stop ST and an aperture AP configured to engage the pivot joint PJ.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, a component/mechanism C/M for a vehicle interior configured to be operated by a vehicle occupant comprising a base B and a cover CV moveable relative to the base B between a closed position and an open position through an intermediate position between the closed position and the open position and a drive mechanism DM configured to move the cover CV from the closed position toward the intermediate position and a retaining mechanism RM configured to retain the cover CV in position between the intermediate position and the open position and a clutch mechanism CM configured to be engaged with the cover CV for movement from the closed position toward the intermediate position and to be disengaged with the cover CV for movement from the intermediate position toward the open position; the cover CV may be configured to be moved from the intermediate position to the open position by the vehicle occupant; the cover CV may be configured to be moved from the open position to the closed position by the vehicle occupant; the clutch mechanism CM may be engaged for movement of the cover CV between the closed position and the intermediate position and disengaged for movement of the cover CV between the intermediate position and the open position; the cover CV may be configured to be moved from the closed position to the intermediate position by the drive mechanism DM. See also TABLE A.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a latch to retain the cover CV in the closed position; the component C may comprise a cover bracket CB configured to attach the cover CV to the base B; the component C may comprise a base bracket BB configured to attach the cover CV to the base B; the cover bracket CB may comprise a plate attached to the cover CV and a set of arms attached to the base bracket BB; the base bracket BB may comprise a plate attached to the base B and a set of arms attached to the cover bracket CB; the cover bracket CB may be coupled to the base bracket BB at a pivot joint PJ between the cover CV and the base B.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, a component C for a vehicle interior configured to be operated by a vehicle occupant comprising a base B and a pivot joint PJ and a cover CV moveable relative to the base B at the pivot joint PJ between a closed position and an open position through an intermediate position between the closed position and the open position and a drive mechanism DM configured to move the cover CV from the closed position toward the intermediate position and a retaining mechanism RM configured to retain the cover CV in position between the intermediate position and the open position and a clutch mechanism CM configured to be engaged with the cover CV for movement from the closed position toward the intermediate position and to be disengaged with the cover CV for movement from the intermediate position toward the open position; the cover CV may be configured to be moved from the intermediate position to the open position by the vehicle occupant; the cover CV may be configured to be moved from the open position to the closed position by the vehicle occupant. See also TABLE A.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D and 19A-19C, the component C may comprise a composite/hinge/pivot/hinge mechanism PM comprising the pivot joint PJ; the pivot/hinge mechanism PM may comprise a shaft SF; the pivot/hinge mechanism PM may comprise a set of posts; the pivot/hinge mechanism PM may comprise a set of posts configured to engage a set of bearings; the pivot/hinge mechanism PM may be configured to engage the retaining mechanism RM and at least one of the drive mechanism DM or the clutch mechanism CM; the pivot/hinge mechanism PM may be configured to engage a clutch mechanism CM; the component C may comprise a cover bracket CB configured to attach the cover CV to the base B; the component C may comprise a base bracket BB configured to attach the cover CV to the base B; the cover bracket CB may comprise a plate attached to the cover CV and a set of arms attached to the base bracket BB; the base bracket BB may comprise a plate attached to the base B and a set of arms attached to the cover bracket CB; the cover bracket CB may be coupled to the base bracket BB by the pivot joint PJ; the cover bracket CB may be configured to engage the drive mechanism DM; the cover bracket CB may be configured to engage a spring mechanism of the drive mechanism DM; the component C may comprise a link LK comprising a body BD and a pin PN and a stop ST and an aperture AP configured to engage the pivot joint PJ.

According to an exemplary embodiment shown schematically in FIGS. 2, 2A-2H, 3A-3F, 4A-4B, 8A-8B, 9A-9B, 10A-10B, 14A, 15A, 17A-17C, 18A-18D, 19A-19C and 20A-20O, a component/mechanism C/M for a vehicle interior comprising a base B and a cover CV rotatably connected with the base B and configured to rotate between a first position and a third position relative to the base B and through a second position between the first position and the third position and a drive mechanism DM configured to drive the cover CV to rotate from the first position to the second position; the cover CV may be configured to rotate between the second position and the third position in response to a force applied to the cover CV by a hand; the cover CV may be configured to be retained at any position between the second position and the third position; the component C may comprise at least one clutch mechanism CM; the clutch mechanism CM may be configured for the coupling and uncoupling of the cover CV and the drive mechanism DM; the drive mechanism DM drives the clutch mechanism CM to rotate the cover CV from the first position to the second position; the clutch mechanism CM may be restricted by the base B against a driving force of the drive mechanism DM on the cover CV when the cover CV rotates from the second position to the third position; the cover CV may be configured to rotate from the second position to the first position in response to a force applied to the cover CV by a hand. See also TABLE A. The base B may comprise a storage compartment; the storage compartment may be cover covered by the cover CV when the cover CV is in the first position; the drive mechanism may comprise at least one of a spring, a torsion spring, a coil spring, a compression spring, a motor, or an air support.

According to an exemplary embodiment shown schematically in 2, 2A-2H, 3A-3F, 4A-4B, 8A-8B, 9A-9B, 10A-10B, 14A, 15A, 16A-16D, 17A-17C, 18A-18D and 19A-19C, a component C for a vehicle interior may comprise a base B with a base bracket BB and a cover CV with a cover bracket CB connected through a rotating shaft PP/PPx in a pivot joint PJ (that may comprise an aperture APx) and configured to rotate between a first/closed position and a third/open position and through a second/intermediate position. See also TABLE A and FIGS. 20A-20O. A clutch mechanism CM may be configured to rotate synchronously with the rotating shaft SF to rotate the cover CV from the first position to the second position and/or to keep stationary such that the cover CV stays at any position between the second position and the third position; the component C may comprise a drive mechanism DM configured to drive the cover CV to rotate from the first position to the second position; the base B may comprise a slot SL and the clutch mechanism CM may comprise a pin PN in the slot SL and configured to move within the slot SL as the cover CV rotates between the first position and the second position; the cover CV rotates to the second position when the pin PN moves to upper end of the slot SL; the clutch mechanism CM comprising a support plate that rotates synchronously with the rotating shaft SF; the pin PN may be configured to be connected with the support plate and/or the rotating shaft SF; the support plate may comprise a circular hole; the rotating shaft SF may comprise a shaft segment of pivot post PPx matching with the circular hole and having a circular cross section; the base B may comprise a stop ST flange; the cover CV may be in contact with the stop ST flange and retained in the third position when the cover CV rotates to the third position; the drive mechanism DM may comprise a torsion spring TS; the torsion spring TS may be on the base B; one end of the torsion spring TS may be connected with the base B and the other end may be under the pin PN; the cover CV may comprise a shaft hole APx matching with the circular shaft segment of pivot post PPx; the shaft hole APx may be formed by the intersection and overlap of two circular holes; the shaft hole APx may comprise opposing first and third edges and opposing second and fourth edges; two sides of the circular shaft segment of pivot post PPx are in contact with the first edge and the third edge when the cover CV is located in the first position; two sides of the circular shaft segment of pivot post PPx are in contact with the second edge and the fourth edge when the cover CV is located in the third position. See FIGS. 16A-16D and TABLE A.

Figure 20A:
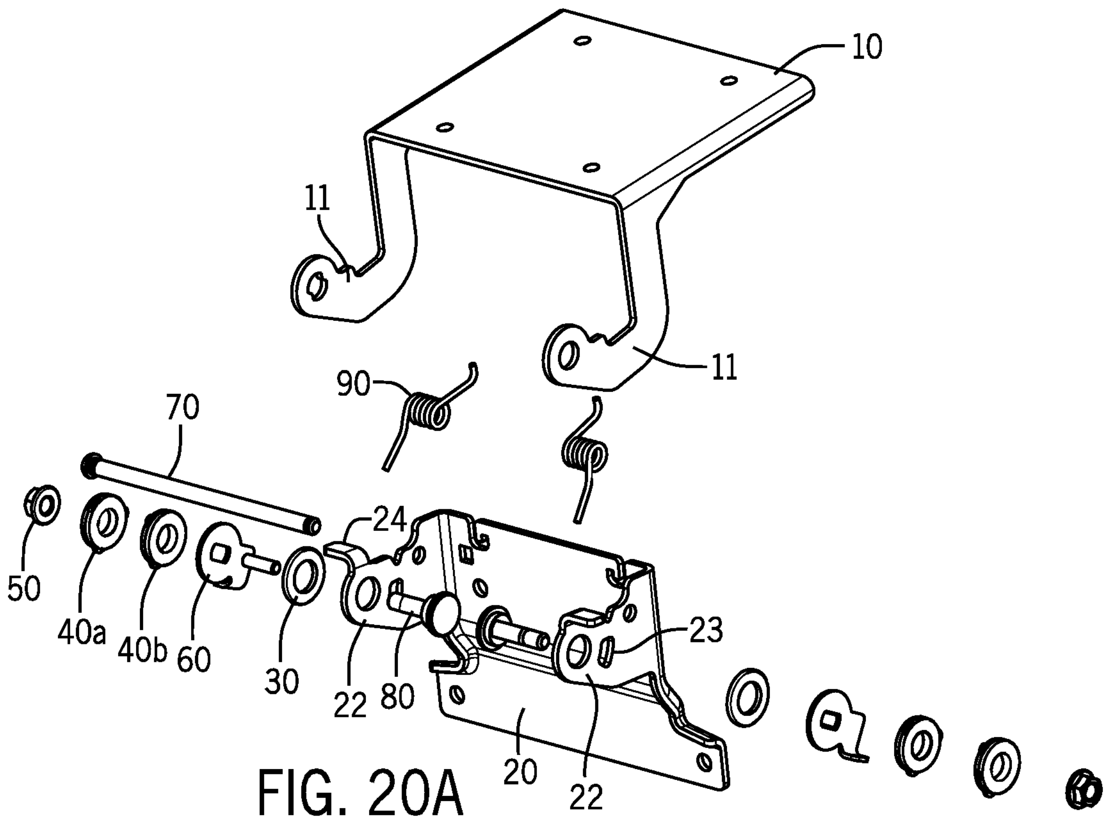
FIG. 20A through 20O are schematic diagrams of a pivot/hinge mechanism and elements according to an exemplary embodiment.
Figure 20B:
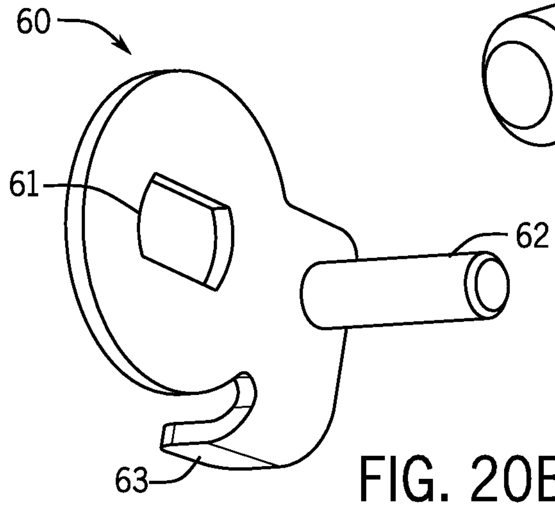
Figure 20C:
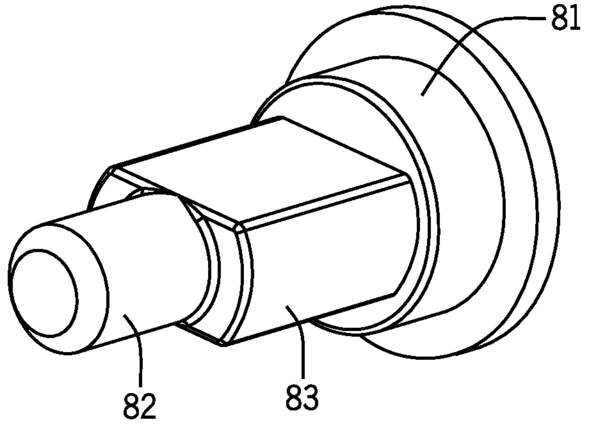
Figure 20D:
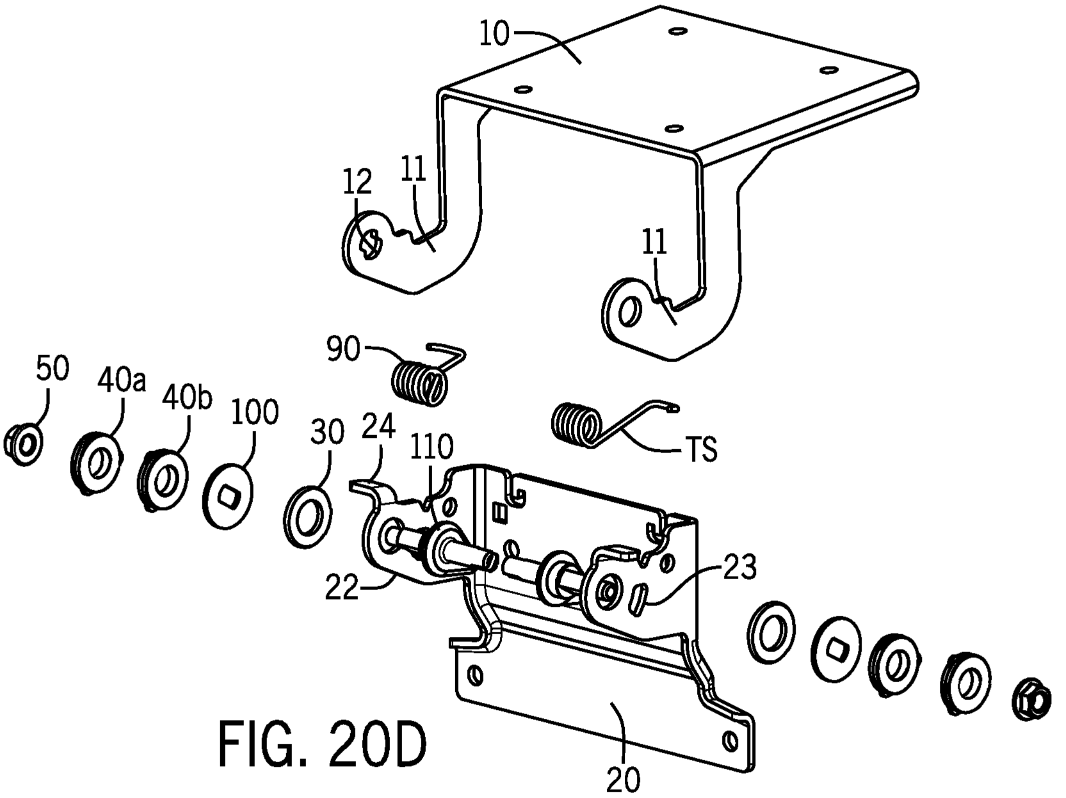
Figure 20E:
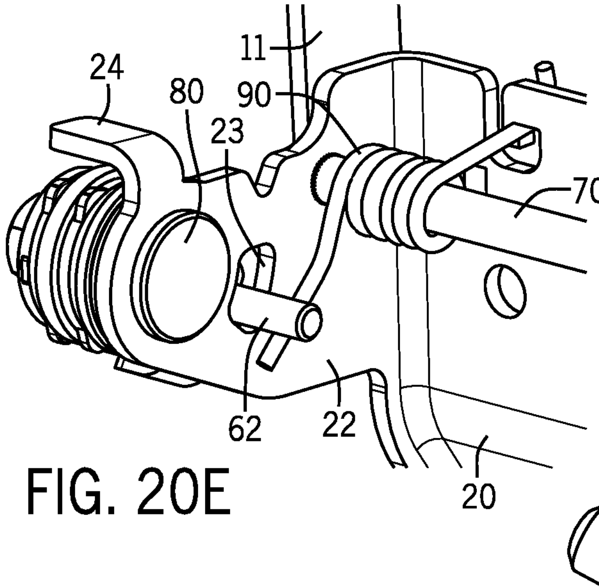
Figure 20F:
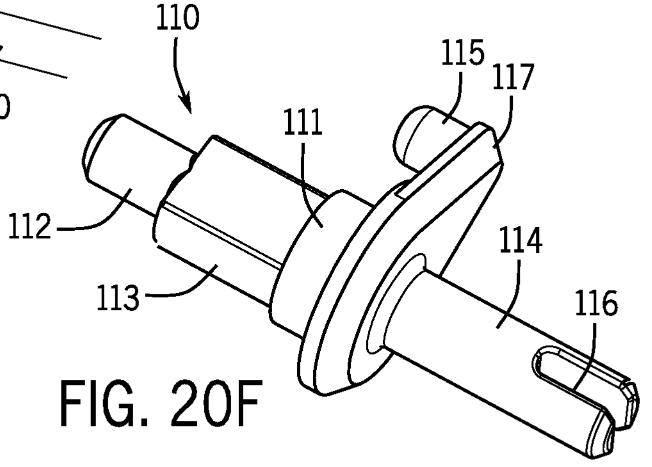
Figure 20G:
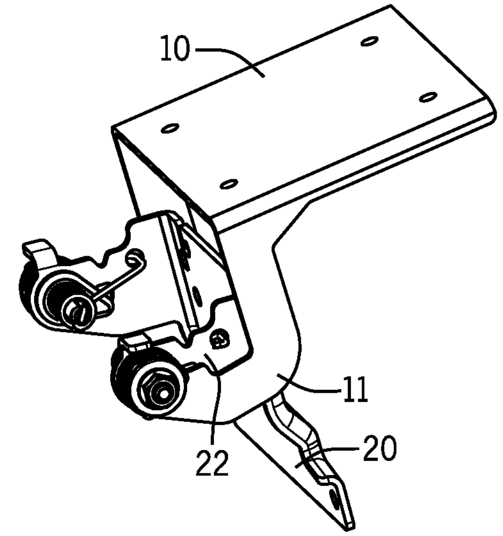
Figure 20H:
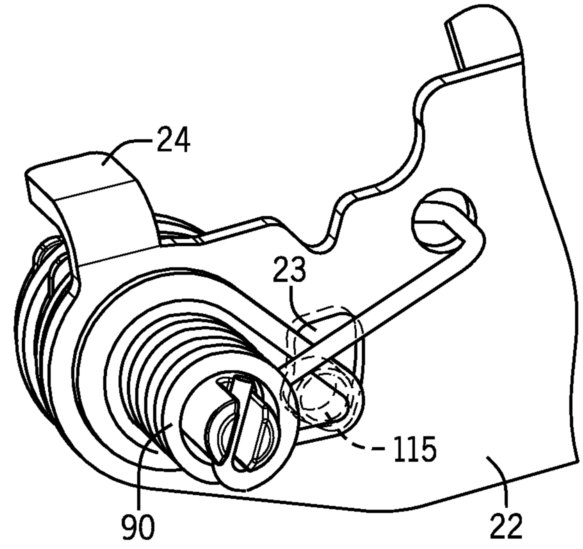
Figure 20I:
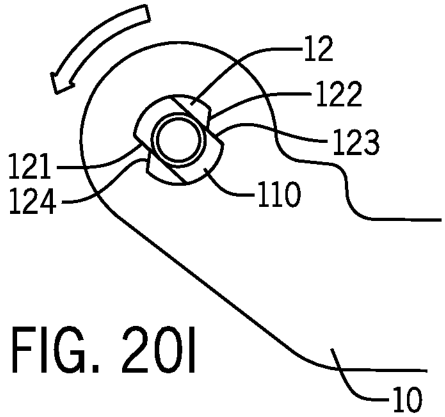
Figure 20J:
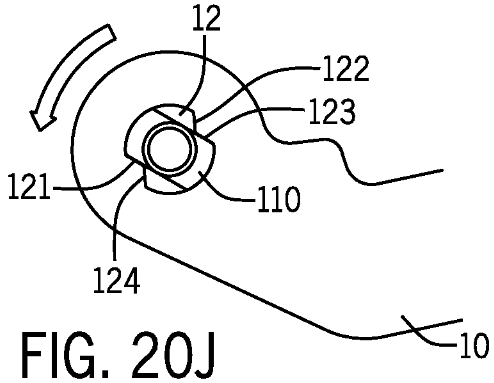
Figure 20K:
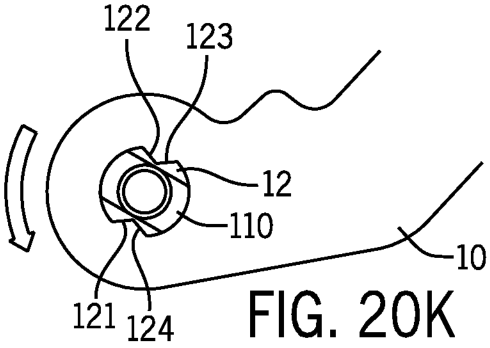
Figure 20L:
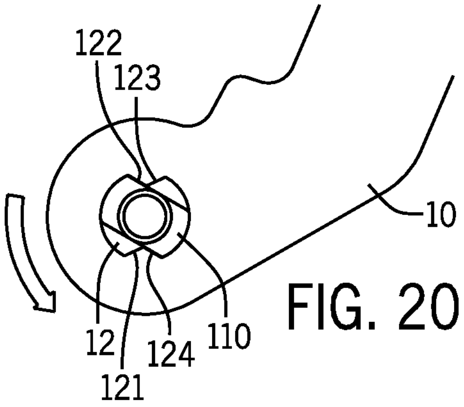

The component may comprise a composite mechanism comprising a hinge/turnover mechanism. See generally TABLE B and TABLE C (FIGS. 20A-20O).

Exemplary Embodiments—B

As shown schematically according to an exemplary embodiment in FIGS. 2A-2H and TABLE C (FIGS. 20A-20O), a vehicle interior component may comprise a hinge/pivot mechanism such as for a floor console FC; the component may comprise a base 20 and a cover 10 mounted on the base 20 and rotatable between a first/closed position (FIG. 2A) and a third/open position (FIG. 2G) relative to the base 20; the cover 10 passes through a second/intermediate position (FIG. 2B) between the first/closed position and the third/open position. The base 20 comprises a storage compartment 21 for receiving and storing items. As shown schematically in FIG. 2A, when the cover 10 is in the first/closed position, the cover 10 covers the storage compartment 21 so that it is not open/exposed; when an occupant unlocks the cover 10 by the hand shown in FIG. 2A with a latch (such as a button, switch, latch, etc.), the cover 10 is released from the base 20 and rotates to the second/intermediate position with the storage compartment 21 partially open/exposed. As shown schematically in FIG. 2B. A drive mechanism can be provided on the base 20 for actuating the cover 10 to rotate from the first/closed position to the second/intermediate position. As shown schematically in FIGS. 2C-2E, the occupant may continue to rotate the cover 10 by hand to any position between the second/intermediate position and the third/open position; after the cover 10 reaches the second/intermediate position, the cover 10 will be retained in position. The occupant may rotate the cover 10 by hand until reaching the third/open position (i.e., the maximum/fully open position) with the storage compartment 21 is fully open/exposed (see FIGS. 2F-2H).

Figure 3A:
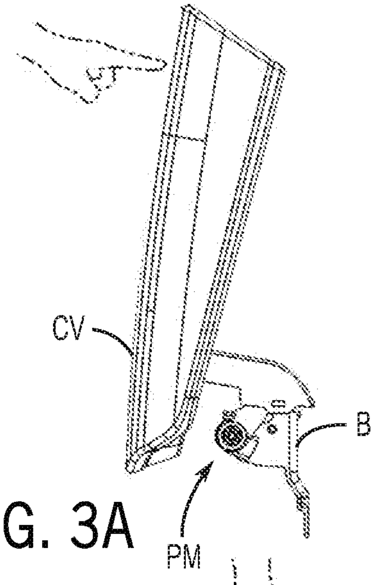
FIGS. 3A through 3F are schematic side views of a component for a vehicle interior comprising the hinge/pivot mechanism according to an exemplary embodiment.
Figure 3B:
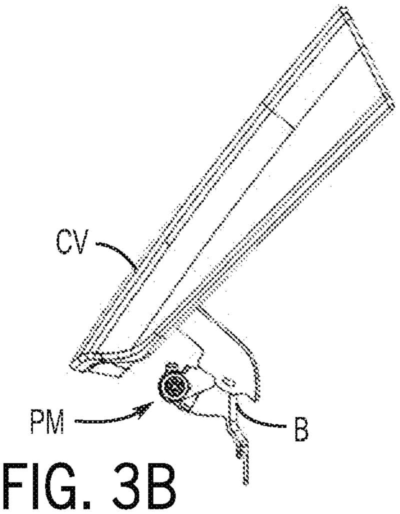
Figure 3C:
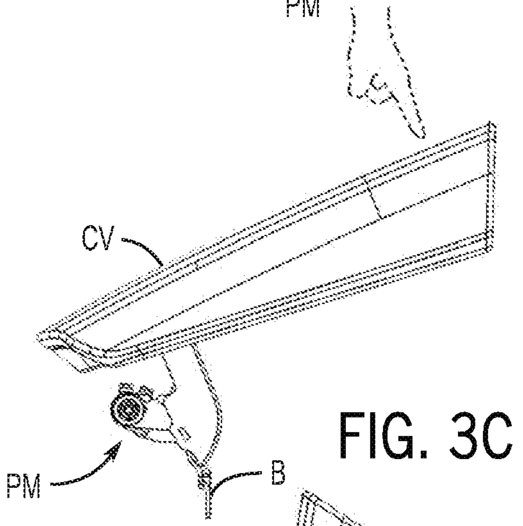
Figure 3D:
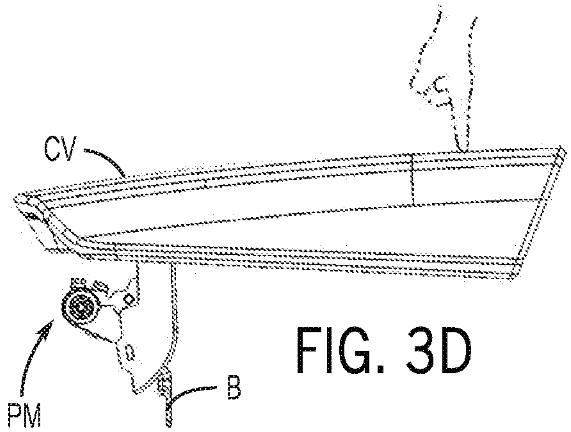

As shown schematically in FIGS. 3A-3F and TABLE C (FIGS. 20A-20O), the cover can be returned from the third/open position to the first/closed position; FIG. 3A is a schematic view of the cover 10 at the third/open position, FIG. 3B is a schematic view of the cover 10 at any position between the third/open position and the second/intermediate position; FIG. 3C is a schematic view of the cover 10 at the second/intermediate position; FIG. 3D is a schematic view of the cover 10 at the first/closed position. The occupant may rotate the cover 10 to rotate from the third/open position to the first/closed position by the hand; when the cover 10 is located between the third/open position and the second/intermediate position, the cover 10 can be retained at the position after the hand releases; when the cover 10 is between the second/intermediate position and the first/closed position, the cover 10 will be driven to the second/intermediate position by the drive mechanism after the hand releases. See also TABLE A.

As shown schematically in FIGS. 4A-4B, 5, 6 and 7 and TABLE C (FIGS. 20A-20O), the component may comprise the hinge/pivot mechanism. As shown schematically in FIGS. 4A-4B, the cover 10 is connected with the base 20 by the hinge/pivot mechanism comprising at least one rotating shaft 80. According to an exemplary embodiment, the cover 10 may comprise at least one support arm/flange 11; the base 20 may comprise at least one connecting part 22, each support arm/flange 11 is connected with the corresponding connecting part 22 by rotating shaft 80; the rotating shaft 80 is comprised with a clutch mechanism comprising a friction plate and a support plate 60. According to an exemplary embodiment, two friction plates 40*a*/40*b* are provided for sides of the support projection/arm 11 of the cover 10.

Figure 4A:
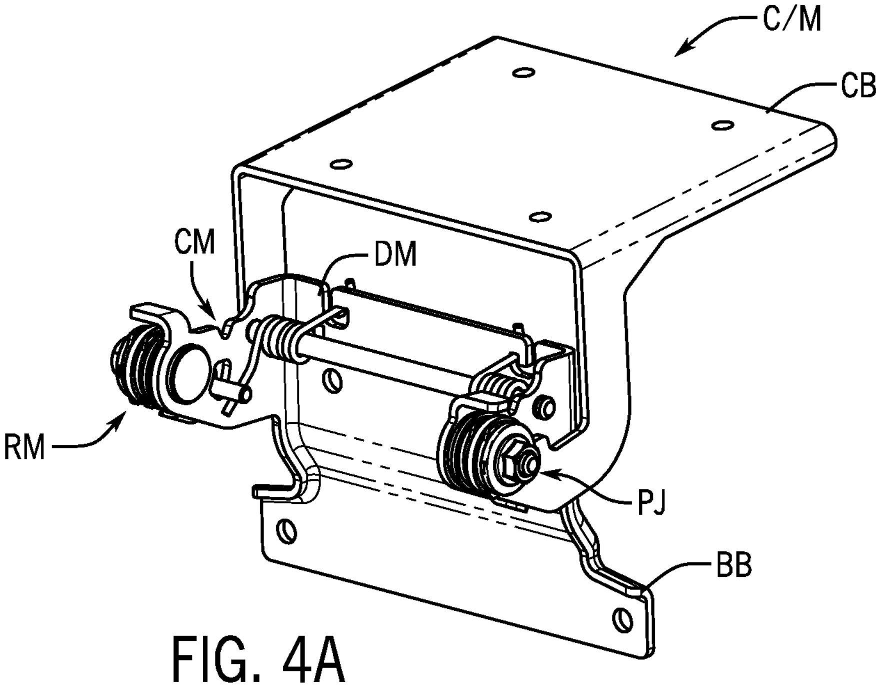
FIG. 4A is a schematic perspective view of the pivot/hinge mechanism according to an exemplary embodiment.
Figure 4B:
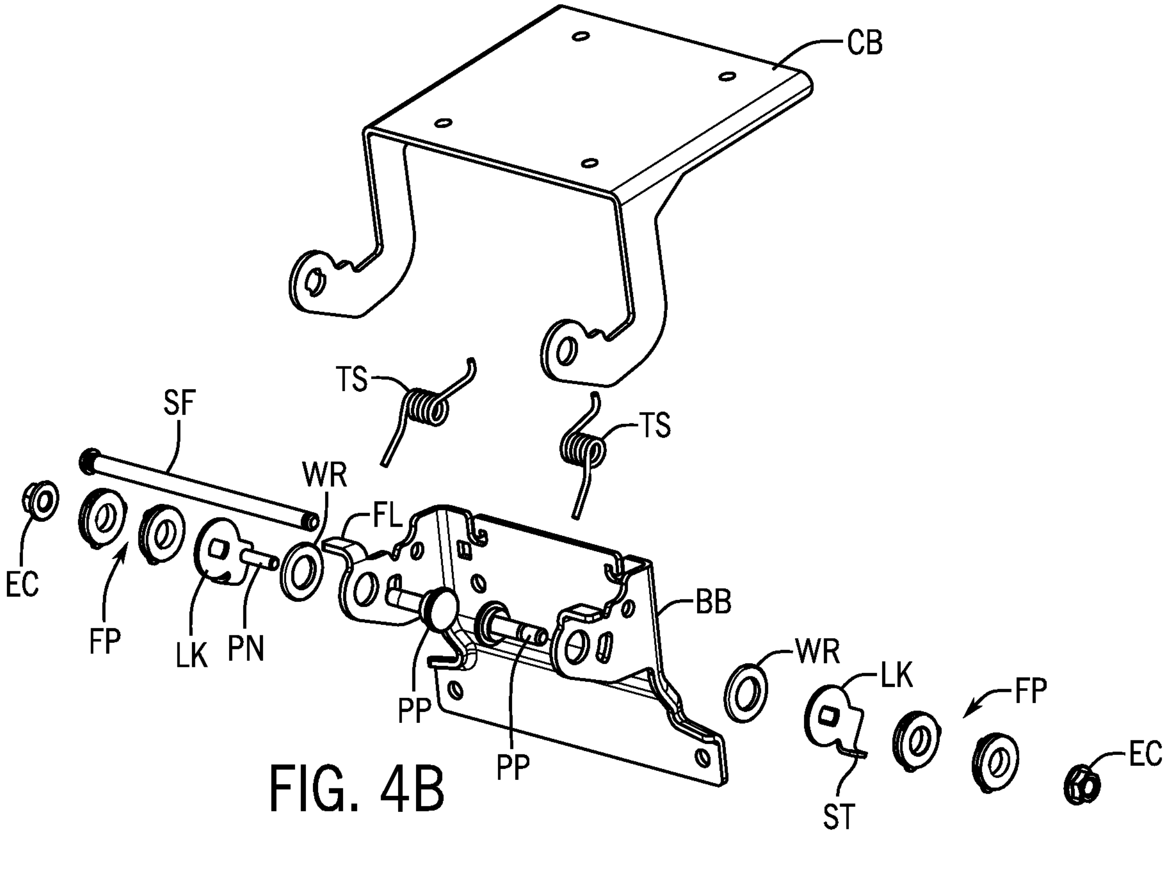
FIG. 4B is a schematic exploded perspective view of the pivot/hinge mechanism according to an exemplary embodiment.
Figure 5:
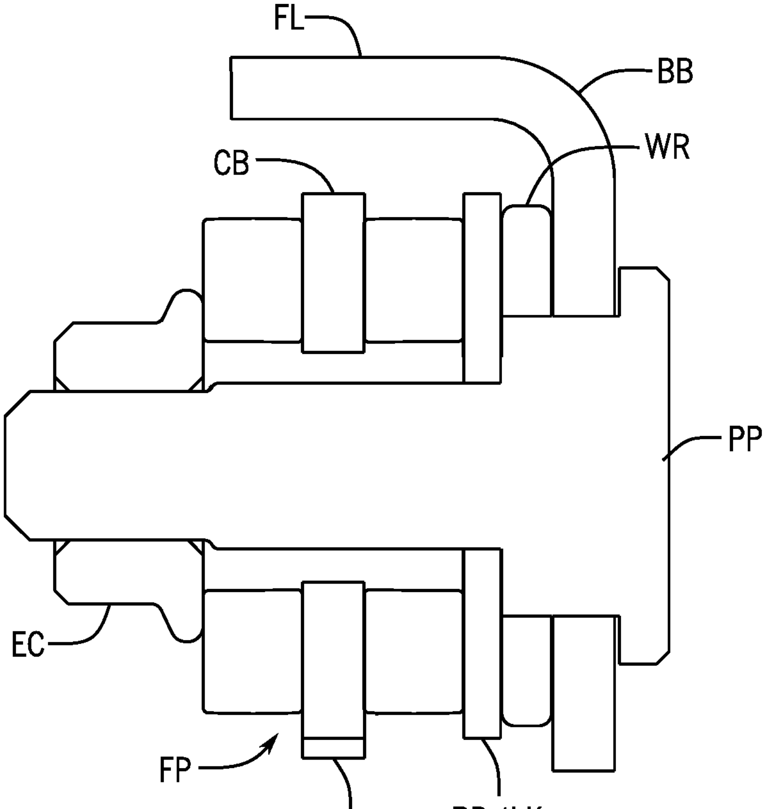
FIG. 5 is a schematic cross-section view of the pivot/hinge mechanism according to an exemplary embodiment.

As shown schematically in FIGS. 4A-4B and 5 and TABLE C (FIGS. 20A-20O), the rotating shaft 80 passes through the connection part 22, the support plate 60, the friction plate 40*b*, the support projection/arm 11 of the cover 10, and the friction plate 40*a* from a side of the connection part 22 of the base 20 and fastened by a self-locking nut 50 or a star collar/end cap to couple the cover 10 to the base 20. A gasket 30 may be provided between the connection part 22 and the support plate 60; the gasket may be made of abrasion resistant-plastic for reducing noise between the connection part 22 and the support plate 60. According to an exemplary embodiment, two support projection/arm 11 and two connection parts 22 are symmetrically provided on the cover 10 and the base 20 with two rotating shafts 80 to provide a pivot joint; two clutch mechanisms are symmetrically connected with the support projection/arm 11 and the connection parts 22 so that the connection between the cover 10 and the base 20 can relatively stable. (According to an exemplary embodiment, alternative suitable arrangements may be provided for the pivot joint/connection of the cover to the base.)

Figure 6:
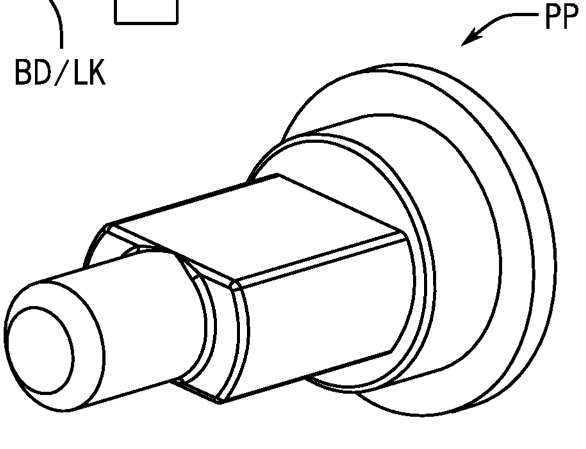
FIG. 6 is a schematic perspective view of a pivot pin of the pivot/hinge mechanism according to an exemplary embodiment.

As shown schematically in FIG. 6 and TABLE C (FIGS. 20A-20O), the rotating shaft 80 comprises a first shaft segment 81 engaged with the connection part 22 of the base 20 and the gasket 30 and a second shaft segment 82 engaged with the self-locking nut 50; a mid-circular cross section formed between the first shaft segment 81 and the second shaft segment 82 is a third shaft segment 83; the third shaft segment 83 is matched with the support plate 60; a step is formed between the third shaft segment 83 and the first shaft segment 81 so as to increase the contact area of the rotating shaft 80 and the support plate 60 and to increase the pressure against the support plate 60 so that the friction force between the friction plate 40*b* and the support plate 60 and between the friction plates 40*a*/40*b* and the support projection/arm 11 of the cover 10 is enhanced/increased.

Figure 7:
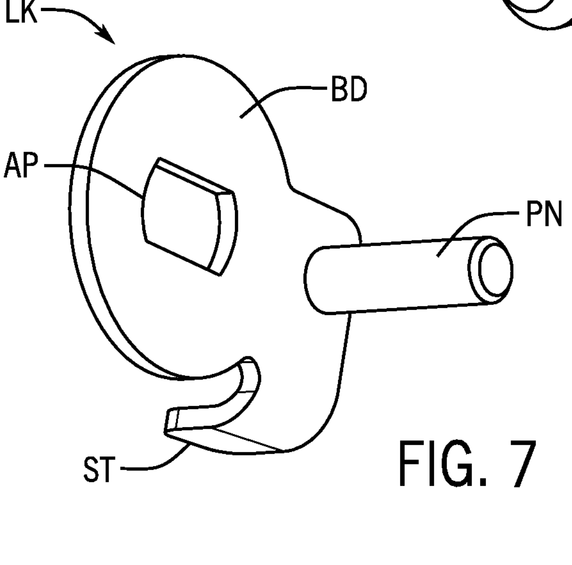
FIG. 7 is a schematic perspective view of a link for the pivot/hinge mechanism according to an exemplary embodiment.
Figure 8A:
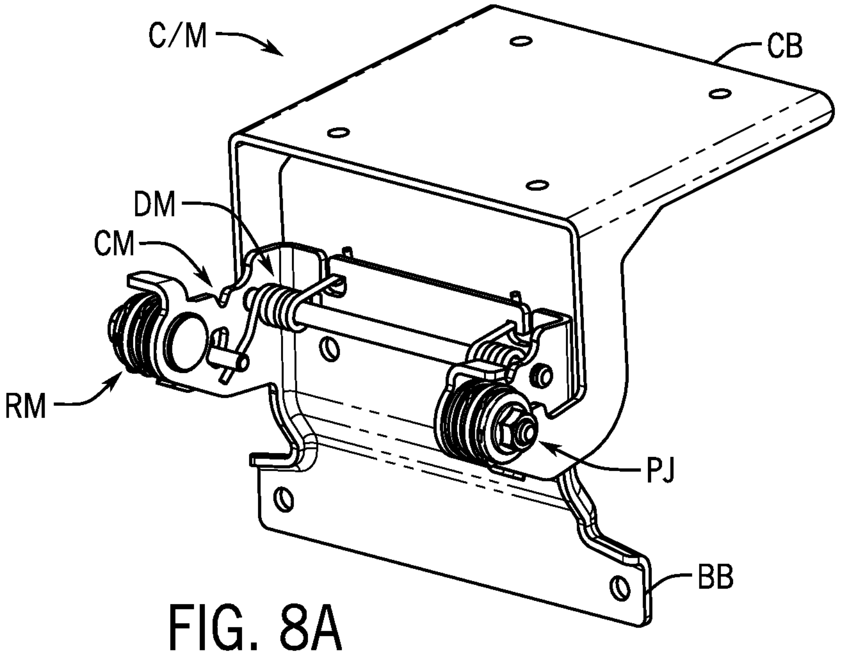
FIG. 8A is a schematic perspective view of the pivot/hinge mechanism according to an exemplary embodiment.
Figure 8B:
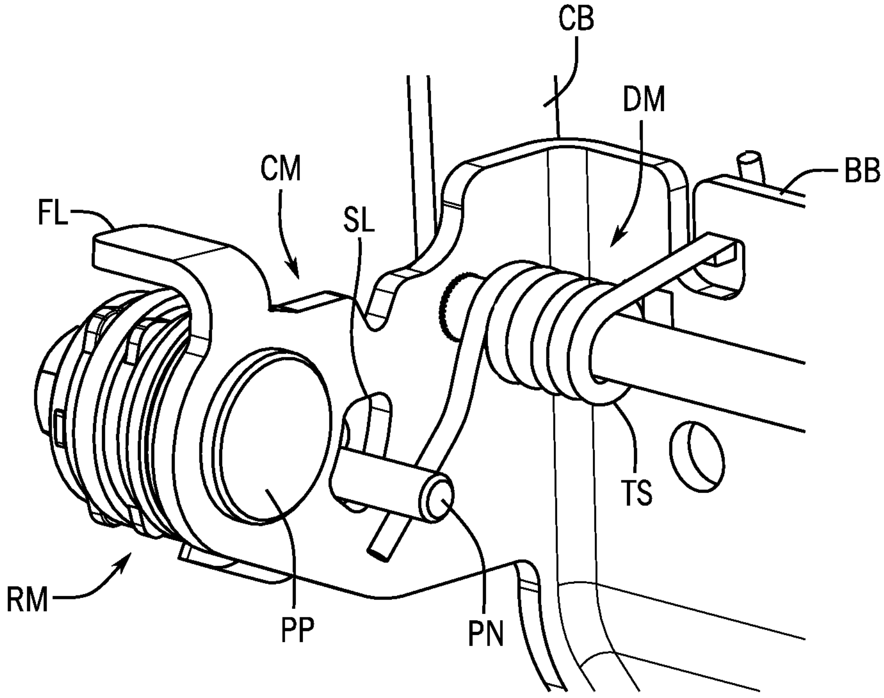
FIG. 8B is a schematic detail perspective view of the pivot/hinge mechanism according to an exemplary embodiment.
Figure 9A:
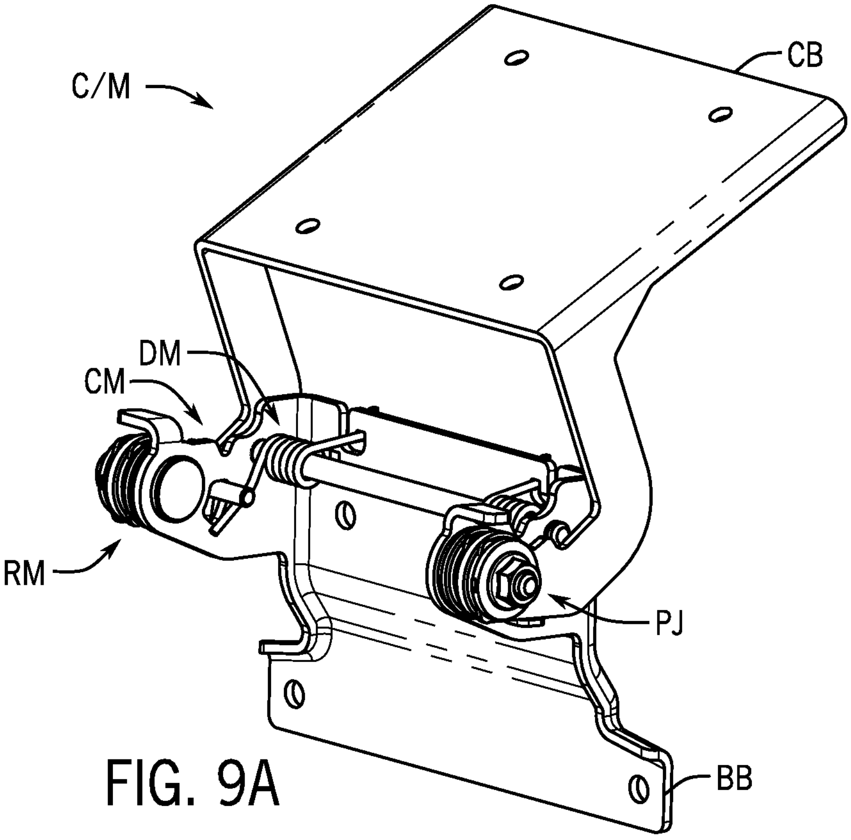
FIG. 9A is a schematic perspective view of the pivot/hinge mechanism according to an exemplary embodiment.
Figure 9B:
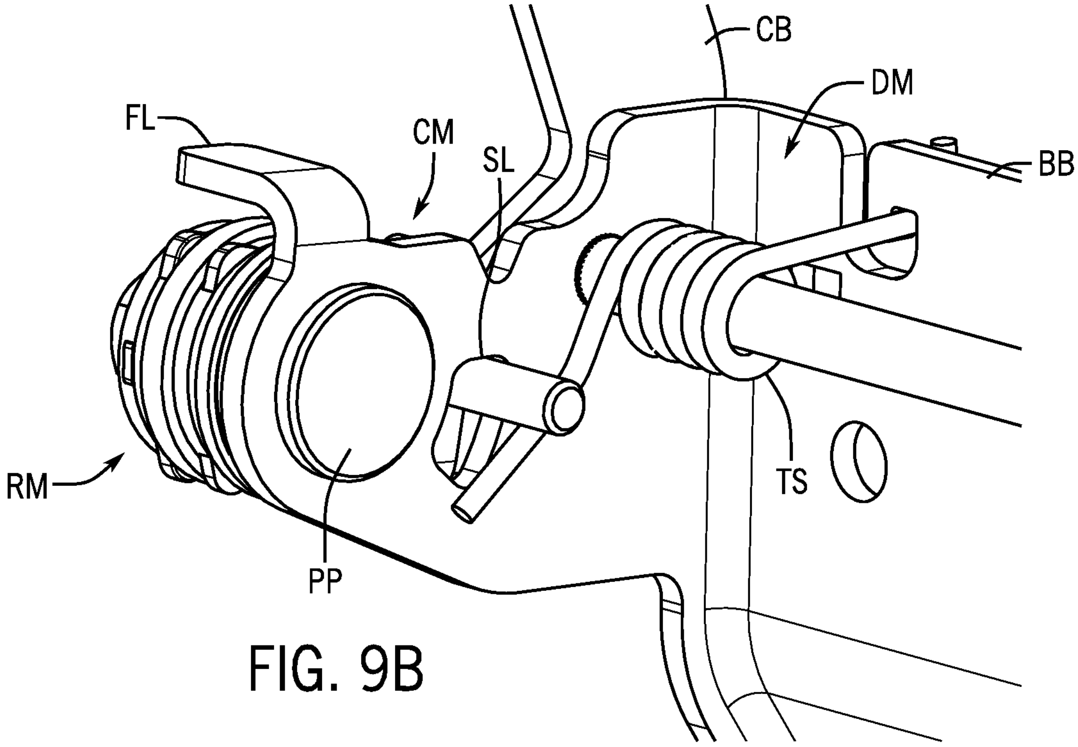
FIG. 9B is a schematic detail perspective view of the pivot/hinge mechanism according to an exemplary embodiment.
Figure 10A:
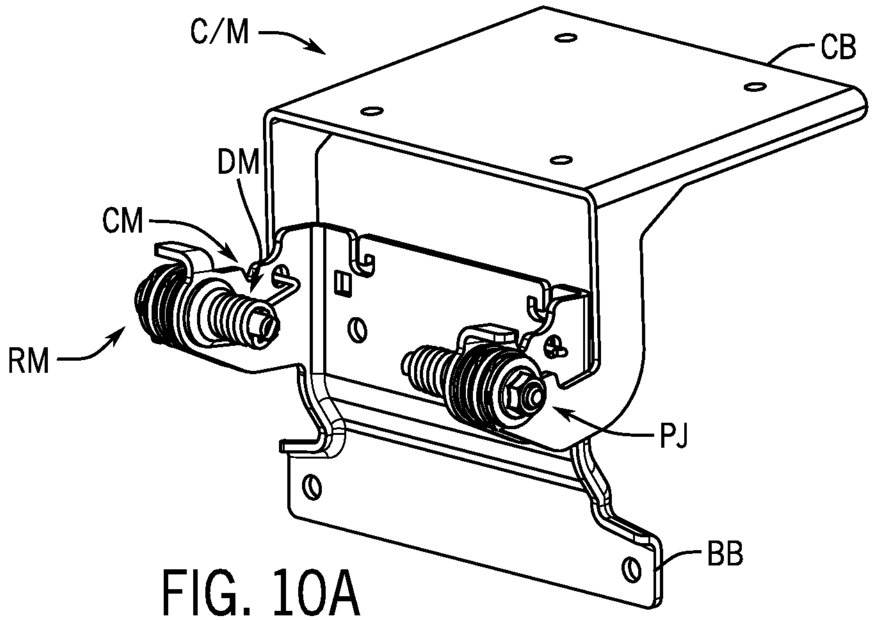
FIG. 10A is a schematic perspective view of the pivot/hinge mechanism according to an exemplary embodiment.
Figure 10B:
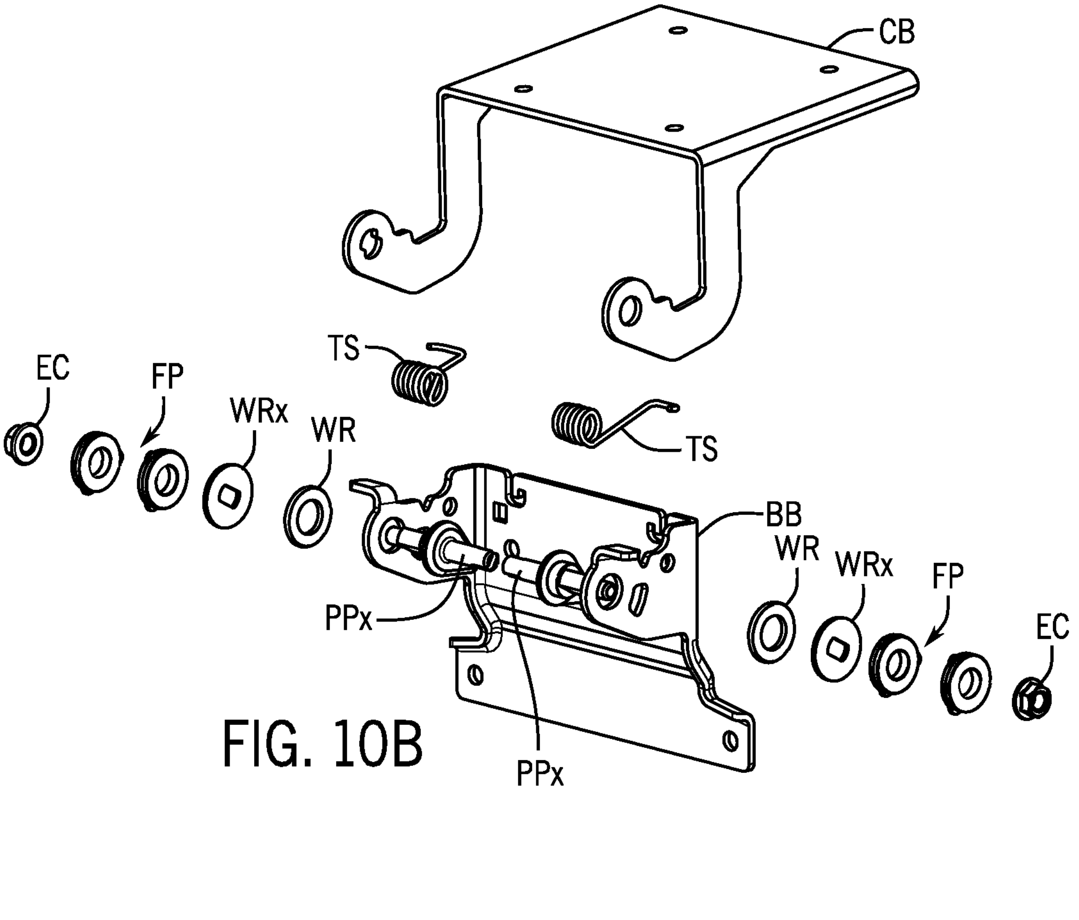
FIG. 10B is a schematic exploded perspective view of the pivot/hinge mechanism according to an exemplary embodiment.
Figure 11:
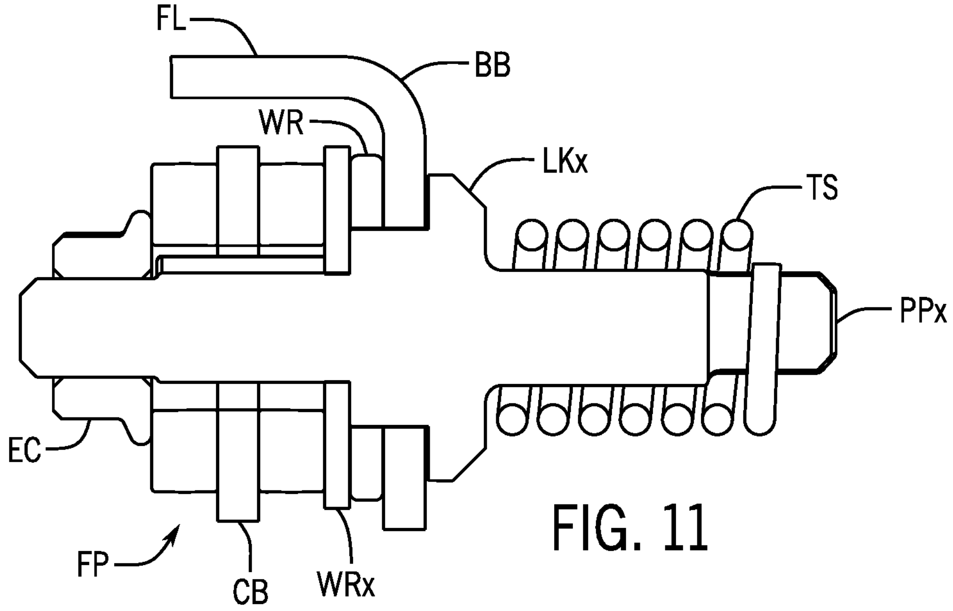
FIG. 11 is a schematic cross-section view of the pivot/hinge mechanism according to an exemplary embodiment.

As shown schematically in FIG. 7 and TABLE C (FIGS. 20A-20O), the support plate 60 is comprised with a mid-circular hole 61 matching with the third shaft segment 83 to provide synchronous rotation of the support plate 60 and the rotating shaft 80; the support plate 60 comprises a pin 62 extending toward the base 20 and a stop flange 63 extending away from the base 20; the connection part 22 of the base 20 is comprised with a slot/hole 23 and the pin 62 is configured to pass through the slot/hole 23 and move within the slot/hole 23 with the rotation of the support plate 60. As indicated schematically in FIGS. 8B and 9B, the stop flange 63 is configured to contact with the support projection/arm 11 of the cover 10 so as to assist in pushing the support projection/arm 11 with the rotation of the support plate 60 for rotating the cover 10. According to an exemplary embodiment, the support plate 60 is made of metal to provide enhanced strength for the pin 62 and for a support force and friction force.

As shown schematically in FIGS. 4A-4B, 8A-8B and 9A-9B and TABLE C (FIGS. 20A-20O), the pivot/hinge mechanism comprises a torsion spring 90 mounted on the base 20 for connecting with the pin 62 to provide a driving force for rotating the cover 10 from the first/closed position to the second/intermediate position. The torsion spring 90 is mounted on the base 20 by a shaft pin 70; one end of the torsion spring 90 is connected with the base 20 and the other end is pressed under the pin 62 of the support plate 60. According to an exemplary embodiment a torsion spring, a coil spring, a tension spring, a compression spring, an air support, a motor, etc. may also be used as driving devices. The drive mechanism providing a driving device such as a spring may be mounted and fixed on the base 20 and then connected with the pin 62. See also FIGS. 10A-10B, 4A-14B and 15A-15B.

As shown schematically according to an exemplary embodiment in FIGS. 2A-2H and 8A-8B and TABLE C (FIGS. 20A-20O), when the cover is located in the first/closed position (FIGS. 2A and 8A), the cover 10 can be locked/retained in place on the base 20 by a locking mechanism such as latch; the storage compartment 21 on the base 20 will be closed; the pin 62 of the support plate 60 is positioned at a lower end of the slot/hole 23 on the base 20; the pin presses one end of the torsion spring 90 so that the torsion spring 90 is compressed. When the occupant unlocks the cover 10 by the latch, the pin 62 is pushed by the force of the torsion spring 90 to rotate upward within the slot/hole 23; the support plate 60 rotates to drive the rotating shaft 80, the friction plates 40*a*/40*b*, and the cover 10 to rotate together until the pin 62 rotates to an upper end of the slot/hole 23 on the base 20 (FIGS. 2B and 9B); under the action of the torsion spring force, the support plate 60 cannot continue to rotate, and the cover 10 rotates to the second/intermediate position As shown schematically in FIG. 2B, the position of the upper end of the slot/hole 23 determines the second/intermediate position of the cover 10; control for the second/intermediate position of the cover 10 is provided by the position of the upper end of the slot/hole 23. According to an exemplary embodiment, a flange extending in the axial direction on the base may be provided to limit the rotational position of the pin by the interference between the flange and the pin of the support plate (to provide control for the second/intermediate position of the cover).

Figure 2C:
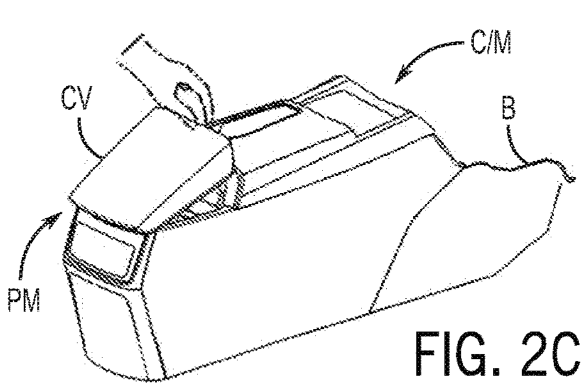
Figure 2D:
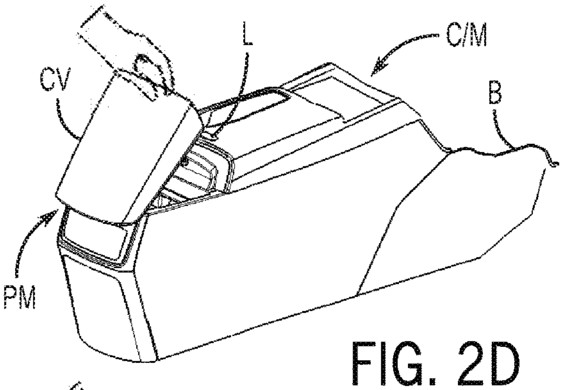
Figure 2E:
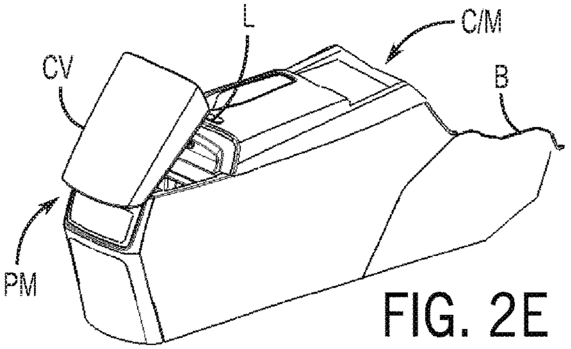
Figure 2F:
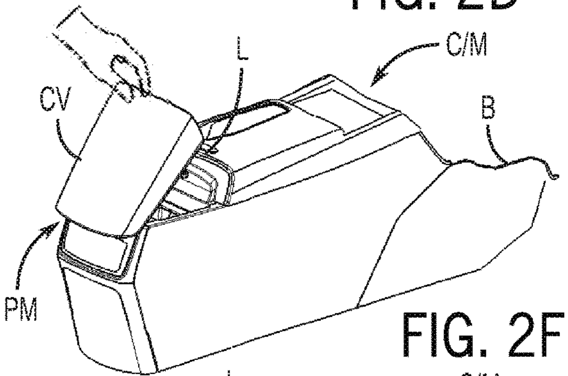
Figure 2G:
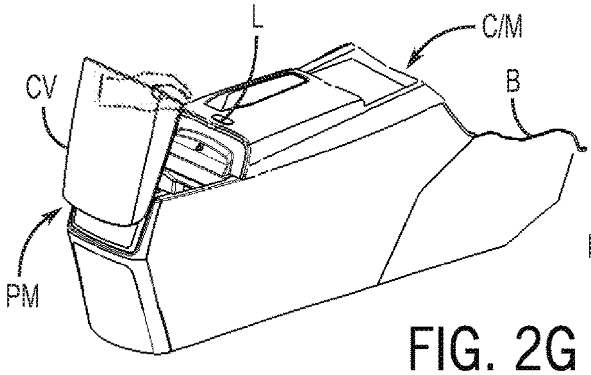
Figure 2H:
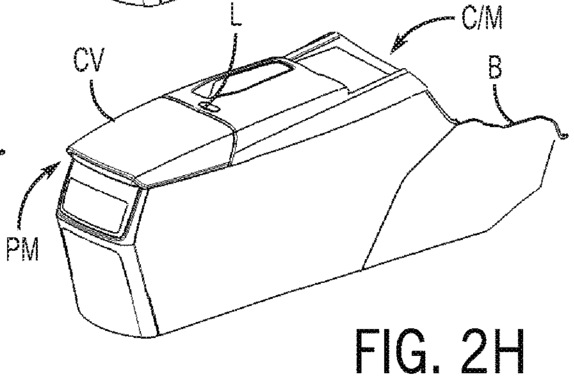
Figure 3E:
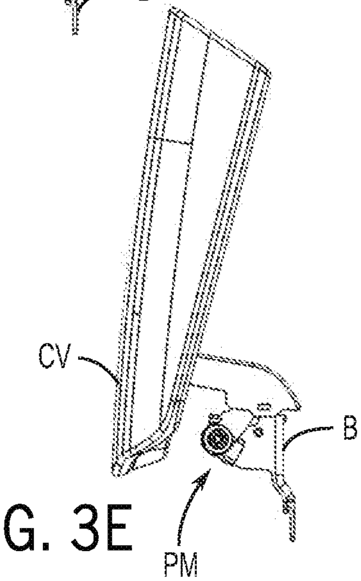
Figure 3F:
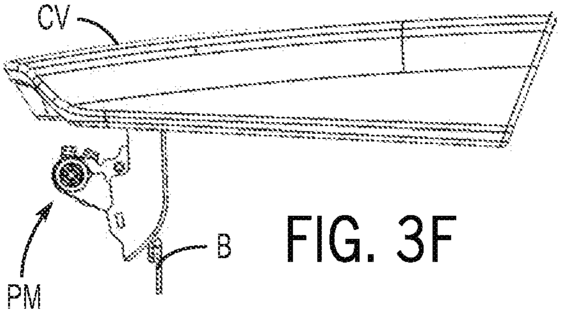

As shown schematically in FIGS. 2C-2D and TABLE C (FIGS. 20A-20O), when the cover 10 is located in the second/intermediate position, for the cover 10 to be rotated an external force by hand applied to the cover 10 is required; the support plate 60 is restricted from rotating and the rotating shaft 80 is retained in position; when the cover 10 is pulled to rotate upward by the hand, the cover 10 rotates relative to at least one of the friction plates 40*a*/40*b*, and/or the cover 10 rotates relative to the support plate 60 together with the friction plates 40*a*/40*b* or only with the friction plate 40*b* to generate friction force; the cover 10 may be rotated to any position toward the maximum/fully open position by the hand against the friction force and the mass/weight of the cover 10 (the friction force enables the cover to be retained in position against the mass/weight after the hand releases). As shown schematically in FIG. 2E, the cover 10 may continue to be rotated by the hand until the maximum/fully open position (i.e., the third/open position). As shown schematically, the base 20 comprises a stop/flange 24; the cover 10 can be rotate until interference with the stop/flange 24 at the maximum rotation position (i.e., the third/open position).

As shown schematically in FIGS. 3A-3F and TABLE C (FIGS. 20A-20O), the cover 10 may be pushed to rotate from the third/open position to the first/closed position by the external force by hand; the cover 10 may be rotated from the third/open position to the second/intermediate position by hand; the cover 10 may be driven to rotate to any position between the third/open position and the second/intermediate position by the hand against the friction force between the cover 10 and at least one of the friction plates 40*a*/40*b* and/or the friction force between the support plate 60 and the friction plate 40*b*, and the friction force enables the cover 10 to be kept at that position against mass/weight, As shown schematically, the cover 10 is to be pushed by hand to the second/intermediate position, As shown schematically in FIG. 3C, and the cover 10 contacts with the stop flange 63 of the support plate 60; when the cover 10 continues to be rotated to the first/closed position, the cover 10 pushes the stop flange 63 to rotate the support plate 60 and the pin 62 within slot/hole 23 of the base 20 at the upper end and torsion spring 90 is engaged; as the cover is moved toward the closed position, pin 62 moves within slot/hole 23 of the base toward the lower end of the slot/hole 23 against one end of the torsion spring 90 so that the torsion spring 90 is compressed until the cover 10 returns to the first/closed position and is latched by the latch/latching mechanism (see FIG. 3D)

As indicated schematically in FIGS. 10-13 and TABLE C/FIGS. 20A-20O, a component comprises a base 20 and a cover 10 connected with the base 20 by a rotating shaft 110; the cover 10 has support projection/arm 11, the base 20 has a connection part 22 and a clutch mechanism comprises a support plate 100, a friction plate 40*a*/a friction plate 40*b*, and a pin 115. Rotating shaft 110 passes through the connection part 22, the support plate 100, the friction plate 40*b*, the support projection/arm 11, and the friction plate 40*a*/and is fastened by a self-locking nut 50 or a star collar to connect the base 20 with the cover 10. A gasket 30 may be provided between the connection part 22 and the support plate 100, and the gasket is made of abrasion resistant-plastic for preventing abnormal noise between the connection part 22 and the support plate 100.

Figure 12:
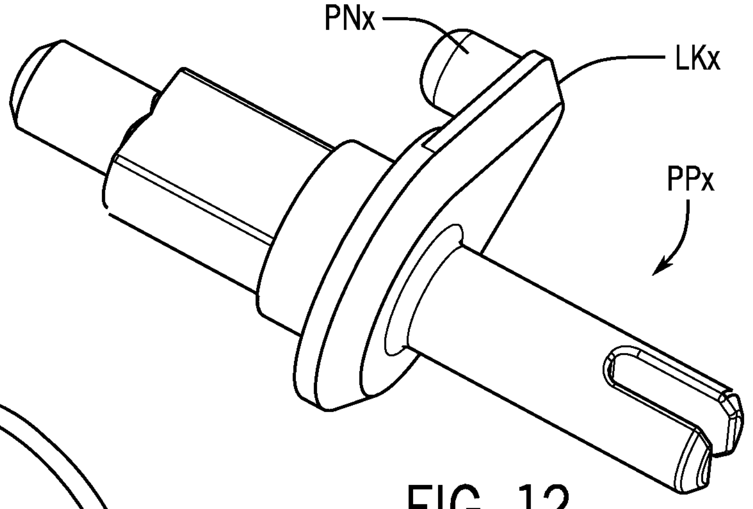
FIG. 12 is a schematic perspective view of a pivot pin of the pivot/hinge mechanism according to an exemplary embodiment.

As shown schematically in FIG. 12, the rotating shaft 110 comprises a first shaft segment 111 engaged with the connection part 22 and the gasket 30, and a second shaft segment 112 engaged with the self-locking nut 50. A mid-circular cross section formed between the first shaft segment 111 and the second shaft segment 112 is a third shaft segment 113, and the third shaft segment 113 is matched with the support plate 100 and the support projection/arm 11 of the cover 10 to realize synchronous rotation of the rotating shaft 110, the support plate 100 and the cover 10 between the first/closed position and the second/intermediate position. A step is formed between the third shaft segment 113 and the first shaft segment 111 to increase the contact area of the rotating shaft 110 and the support plate 100 and to increase the pressure against the support plate 100; the friction force between the friction plate 40*b* and the support plate 100, and between the friction plates 40*a*/40*b* and the support projection/arm 11 of the cover 10 may be enhanced. The rotating shaft 110 comprises a stop segment 117 which is provided at one end of the first shaft segment 111 away from the third shaft segment 113 for contacting with the connection part 22 of the cover to stop and to prevent the rotating shaft 110 from falling through a shaft hole. The pin 115 is provided on the stop segment 117 on the same side as the first shaft segment 111; the pin 115 is configured to pass through the slot/hole 23 of the base 20 and move within the slot/hole 23 with the rotation of the rotating shaft 110; the stop segment 117 is comprised with a fourth shaft segment 114 on one side away from the first shaft segment 111; the fourth shaft segment 114 is comprised with a clamping slot 116; the torsion spring 90 winds around the fourth shaft segment 114 with one end inserted into the clamping slot 116 and the other end connected with the base 20; a driving force for rotating the cover 10 from the first/closed position to the second/intermediate position is provided by torsion spring 90. According to an exemplary embodiment a torsion spring, a coil spring, a tension spring, a compression spring, an air support, a motor, etc. may also be adopted to comprise a driving force.

Figure 13:
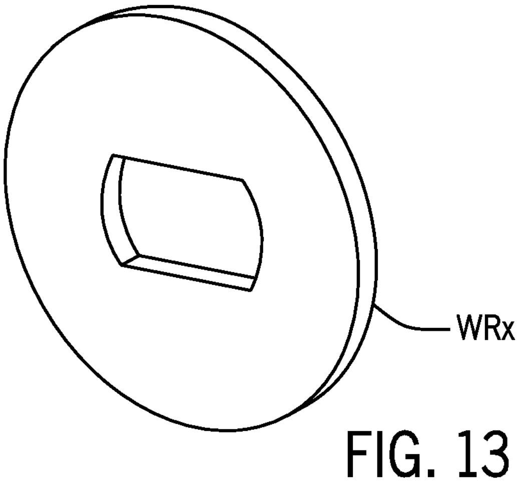
FIG. 13 is a schematic perspective view of a link for the pivot/hinge mechanism according to an exemplary embodiment.

As shown schematically in FIG. 13, the support plate 100 has a mid-circular hole 101 matching with the third shaft segment 113 of the rotating shaft 110 to realize the synchronous rotation of the support plate 100 and the rotating shaft 110. See also TABLE C (FIGS. 20A-20O).

Figure 14A:
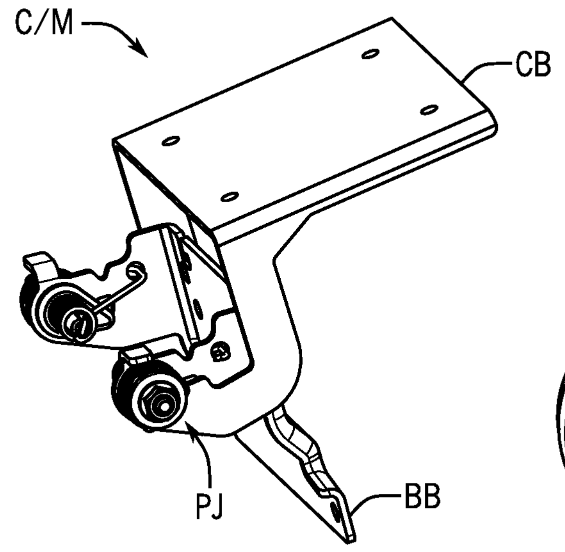
FIG. 14A is a schematic perspective view of the pivot/hinge mechanism according to an exemplary embodiment.
Figure 14B:
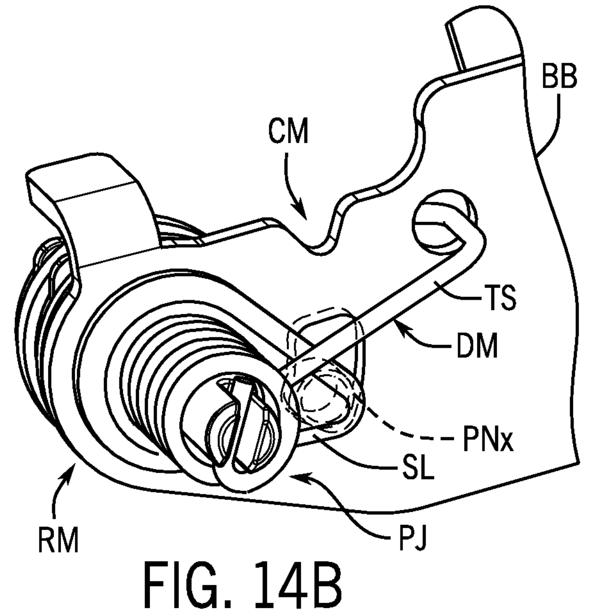
FIG. 14B is a schematic detail perspective view of the pivot/hinge mechanism according to an exemplary embodiment.
Figure 15A:
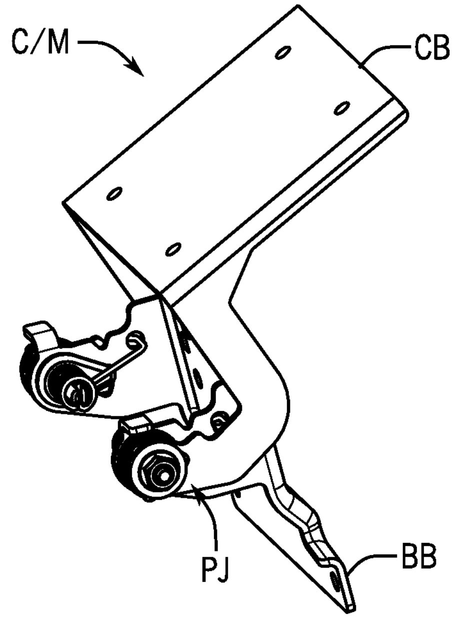
FIG. 15A is a schematic perspective view of the pivot/hinge mechanism according to an exemplary embodiment.
Figure 15B:
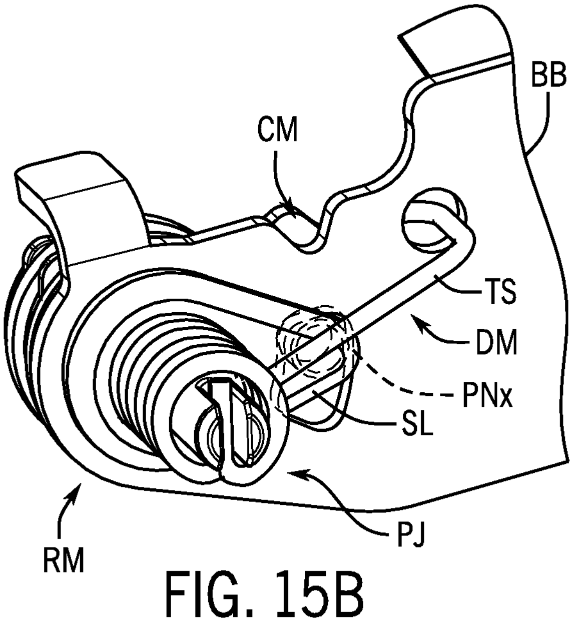
FIG. 15B is a schematic detail perspective view of the pivot/hinge mechanism according to an exemplary embodiment.

As shown schematically in FIGS. 2A and 14A and TABLE C (FIGS. 20A-20O), the cover 10 may be latched in the first/closed position relative to the base 20 by a latch/locking mechanism. In the closed position, the pin 115 of the rotating shaft 110 is positioned at a lower end of the slot/hole 23 on the connection part 22 of the base 20; the torsion spring 90 is in a compressed state. When the occupant unlocks the cover 10 at the latch, the pin 115 is pushed by the elastic force of the torsion spring 90 to rotate upward within the slot/hole 23; the rotating shaft 110 rotates to drives the support plate 100, the friction plate 40*a*/the friction plate 40*b* and the cover 10 to rotate together, until the pin 115 rotates to the upper end of the slot/hole 23. As shown schematically in FIG. 15B, under the action of the torsion spring force, the rotating shaft 110 cannot continue to rotate; the cover 10 rotates to the second/intermediate position. As shown schematically in FIGS. 2B and 15A, a position of the upper end of the slot/hole 23 determines the second/intermediate position of the cover 10; control for the second/intermediate position of the cover 10 is provided by setting the position of the upper end of the slot/hole 23. According to an exemplary embodiment, the slot/hole on the base may be modified and/or the flange extending in the axial direction on the base 20 to limit the rotational position of the pin 115 by the interference between the flange and the pin 115 is acknowledged.

As shown schematically in FIGS. 16A-16D and TABLE C (FIGS. 20A-20O), the cover 10 has a shaft hole 12 matching with the rotating shaft 110 so that that the cover 10 synchronously with the rotating shaft 110 between the first/closed position; in the second/intermediate position, the cover may be rotated around the rotating shaft 110 between the second/intermediate position and the third/open position. The narrow direction in FIGS. 16A-16D is the rotating direction; the shaft hole 12 is formed by the intersection and overlap of two symmetrical mid-circular holes; the shaft hole matches with the third shaft segment 113 of the rotating shaft 110 and comprises a first edge 121, a second edge 122, a third edge 123 and a fourth edge 124. As shown schematically in FIG. 16A, when the cover 10 is in the first/closed position two sides of the third shaft segment 113 of the rotating shaft 110 are in contact with the first edge 121 and the third edge 123; when the rotating shaft 110 rotates counterclockwise under the action of the torsion spring 90, the first edge 121 and the third edge 123 will abut against the rotating shaft 110 so that the rotating shaft 110 drives the cover 10 to rotate counterclockwise, and the rotating shaft 110 drives the cover 10 to rotate to the second/intermediate position under the action of the torsion spring 90. As indicated schematically in FIG. 16B, the pin 115 of the rotating shaft 110 is restricted at the upper end of the slot/hole 23 the rotating shaft 110 cannot continue to rotate. When the cover 10 is in the second/intermediate position, for the cover 10 to continue to be rotated an external force by the hand applied to the cover 10 is required. As shown schematically in FIGS. 2C-2D, the cover 10 may rotate counterclockwise around the rotating shaft 110 due to a gap between the rotating shaft 110 and the second edge 122 and a gap between the rotating shaft and the fourth edge 124; when the cover 10 is pushed to rotate counterclockwise by the hand, the cover 10 rotates relative to at least one of the friction plates 40*a*/40*b*, and/or the cover 10 rotates relative to the support plate 100 together with the friction plates 40*a*/40*b* or only with the friction plate 40*b* to generate friction force; the cover 10 is driven to rotate to any position before the maximum/fully open position by the hand against the friction force and the mass/weight of the cover 10, and the friction force enables the cover 10 to be kept at that position against its own mass/weight after the hand releases; the cover 10 may continue to be rotated by hand counterclockwise until the second edge 122 and the fourth edge 124 of the shaft hole 12 contact with the rotating shaft 110; the cover 10 is abut against the rotating shaft 110 and cannot continue to rotate counterclockwise; and the cover 10 is in the maximum/fully open position (i.e., the third/open position).

Figure 16A:
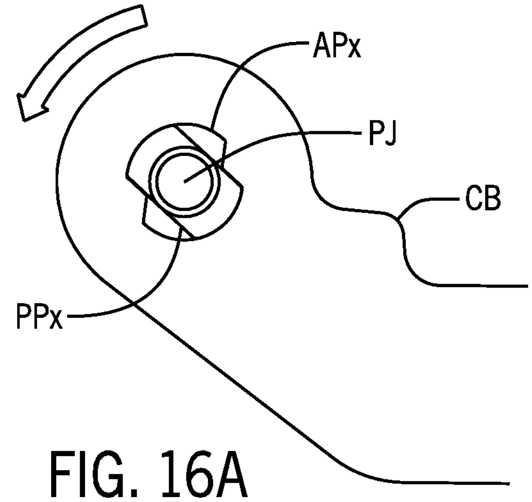
FIGS. 16A through 16D are schematic diagrams of the pivot joint of the pivot/hinge mechanism according to an exemplary embodiment.
Figure 16B:
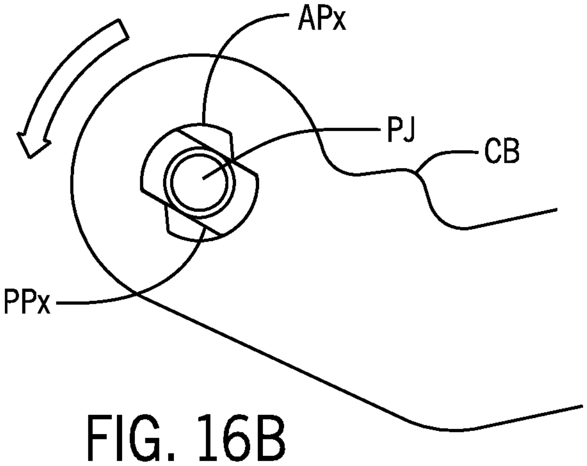
Figure 16C:
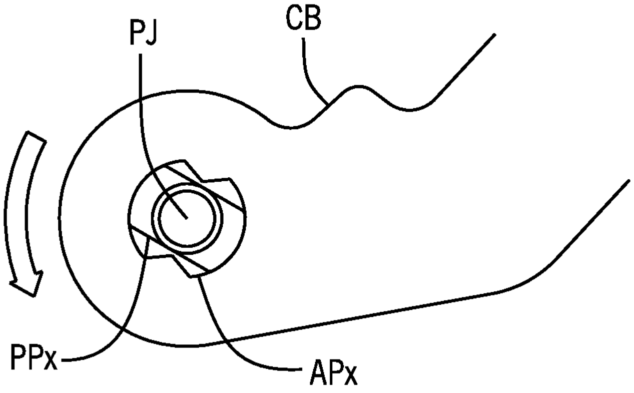
Figure 16D:
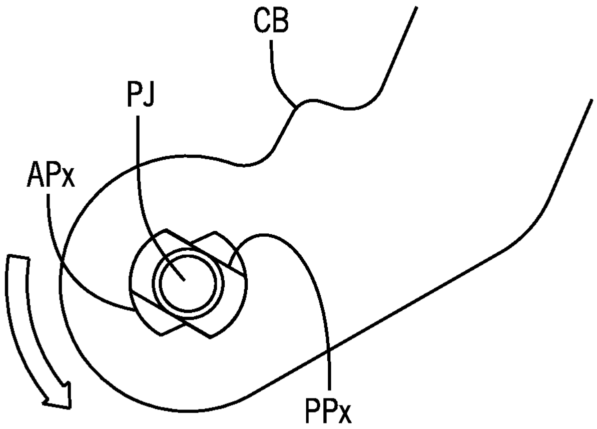
Figure 17A:
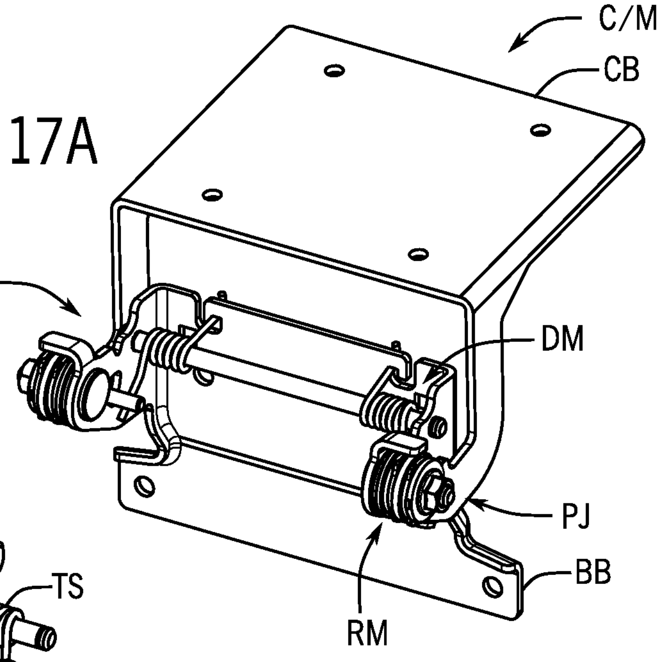
FIG. 17A is a schematic perspective view of the pivot/hinge mechanism according to an exemplary embodiment.
Figure 17B:
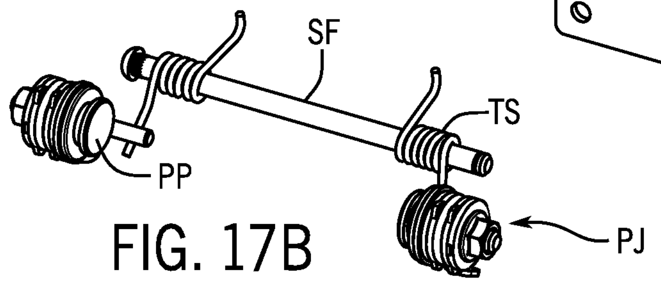
FIG. 17B is a schematic detail perspective view of the pivot/hinge mechanism according to an exemplary embodiment.
Figure 17C:
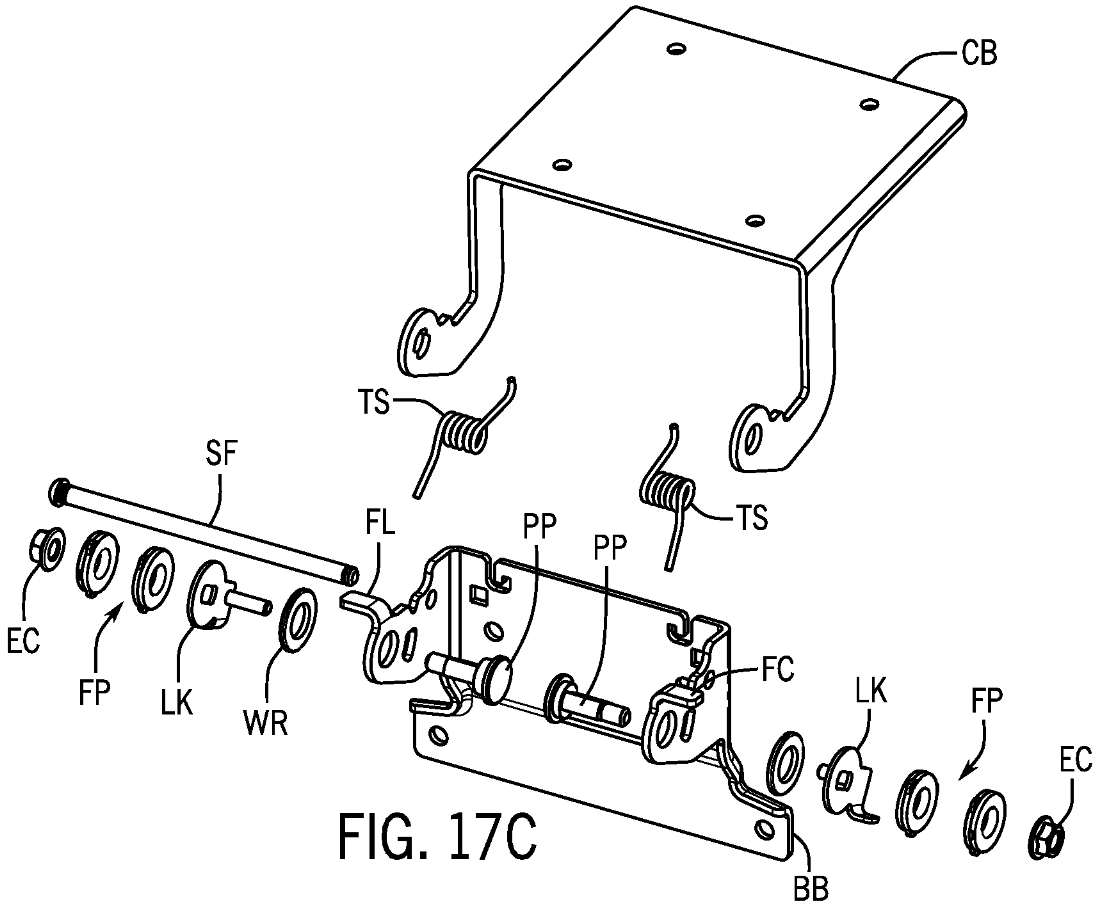
FIG. 17C is a schematic exploded perspective view of the pivot/hinge mechanism according to an exemplary embodiment.
Figure 18A:
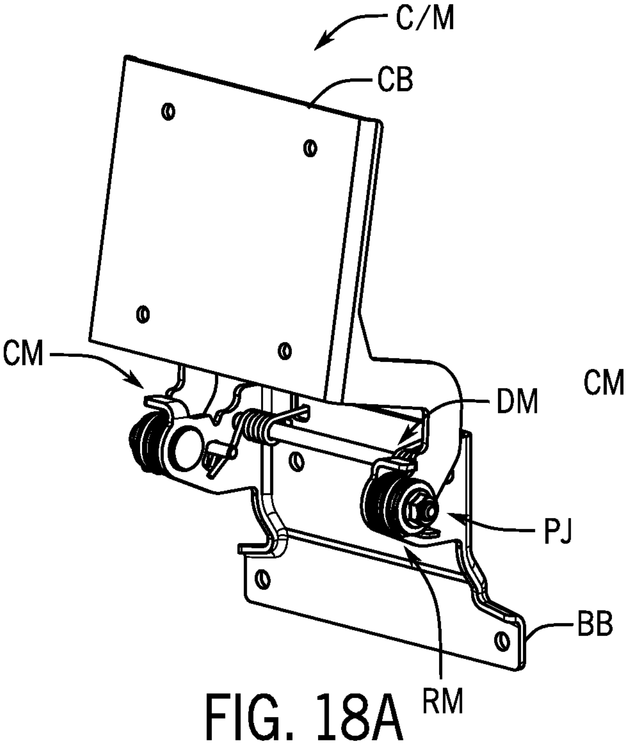
FIGS. 18A through 18D are schematic perspective views of the pivot/hinge mechanism according to an exemplary embodiment.
Figure 18B:
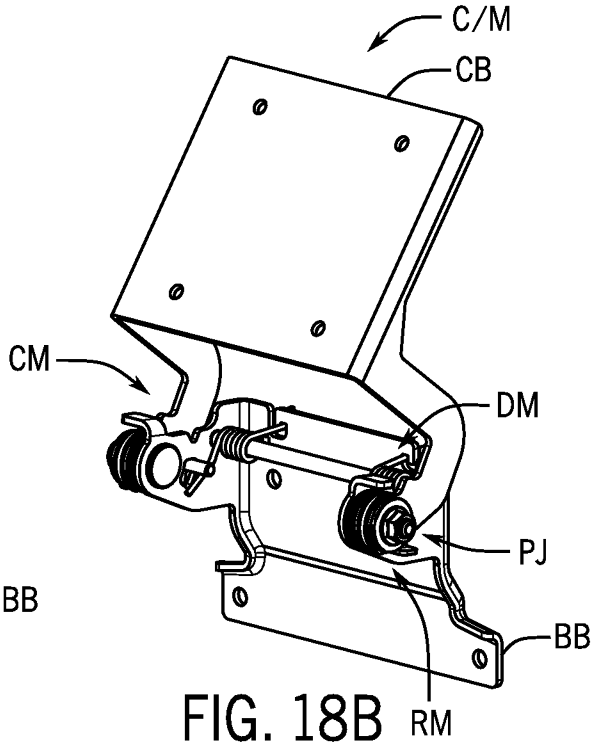
Figure 18C:
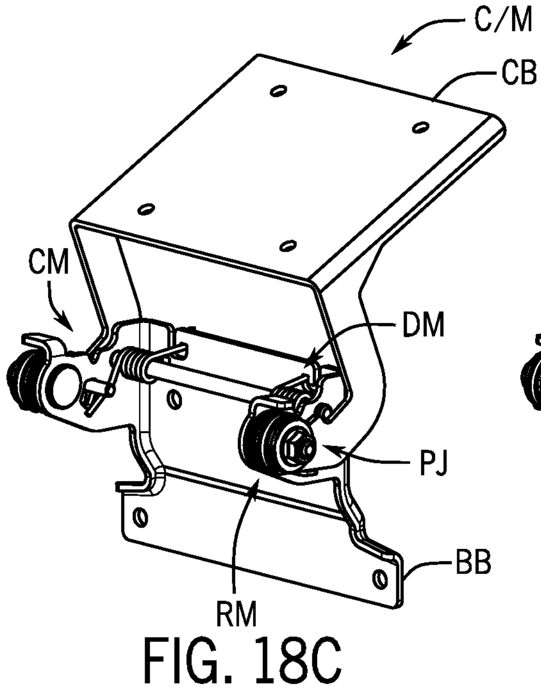
Figure 18D:
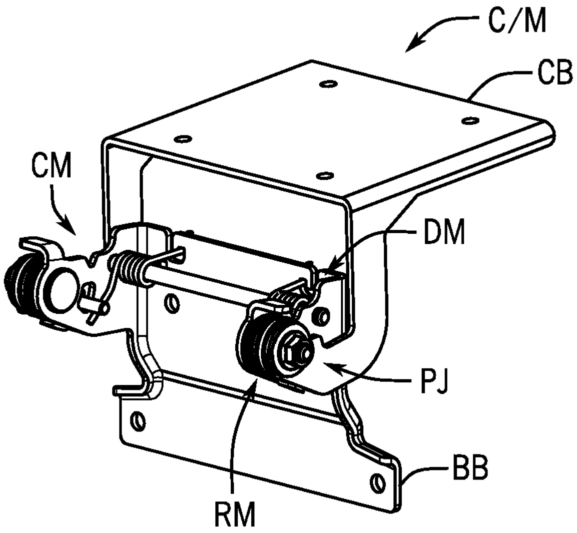
Figure 19A:
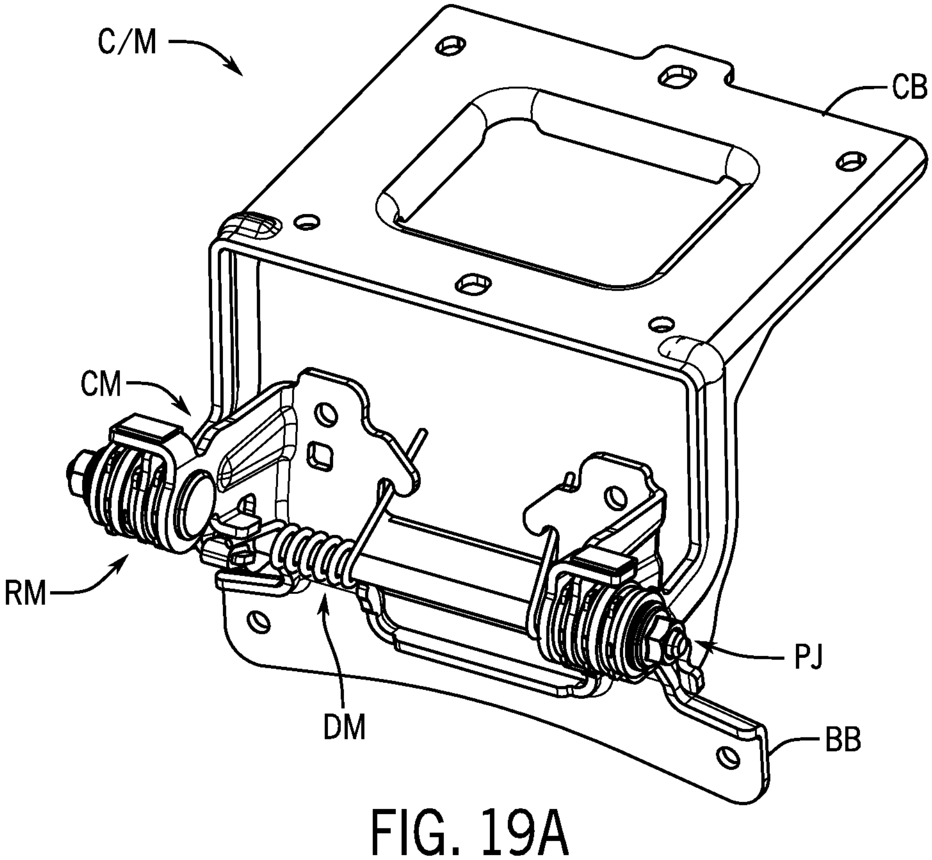
FIG. 19A is a schematic perspective view of the pivot/hinge mechanism according to an exemplary embodiment.
Figure 19B:
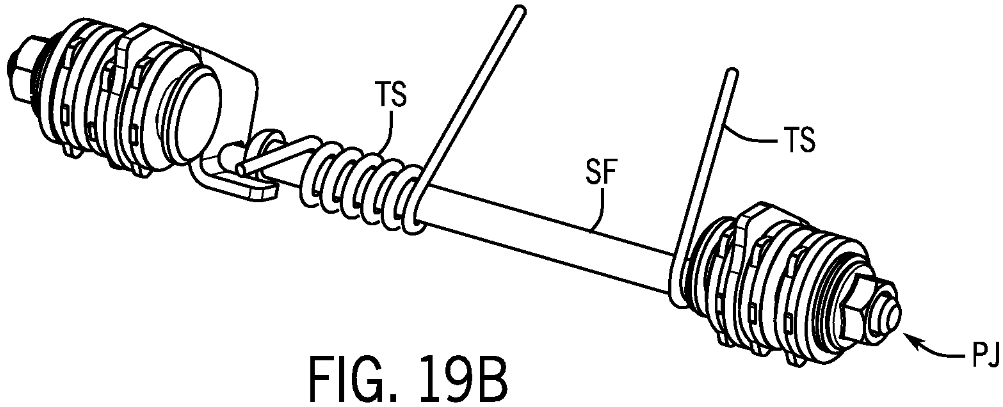
FIG. 19B is a schematic detail perspective view of the pivot/hinge mechanism according to an exemplary embodiment.
Figure 19C:
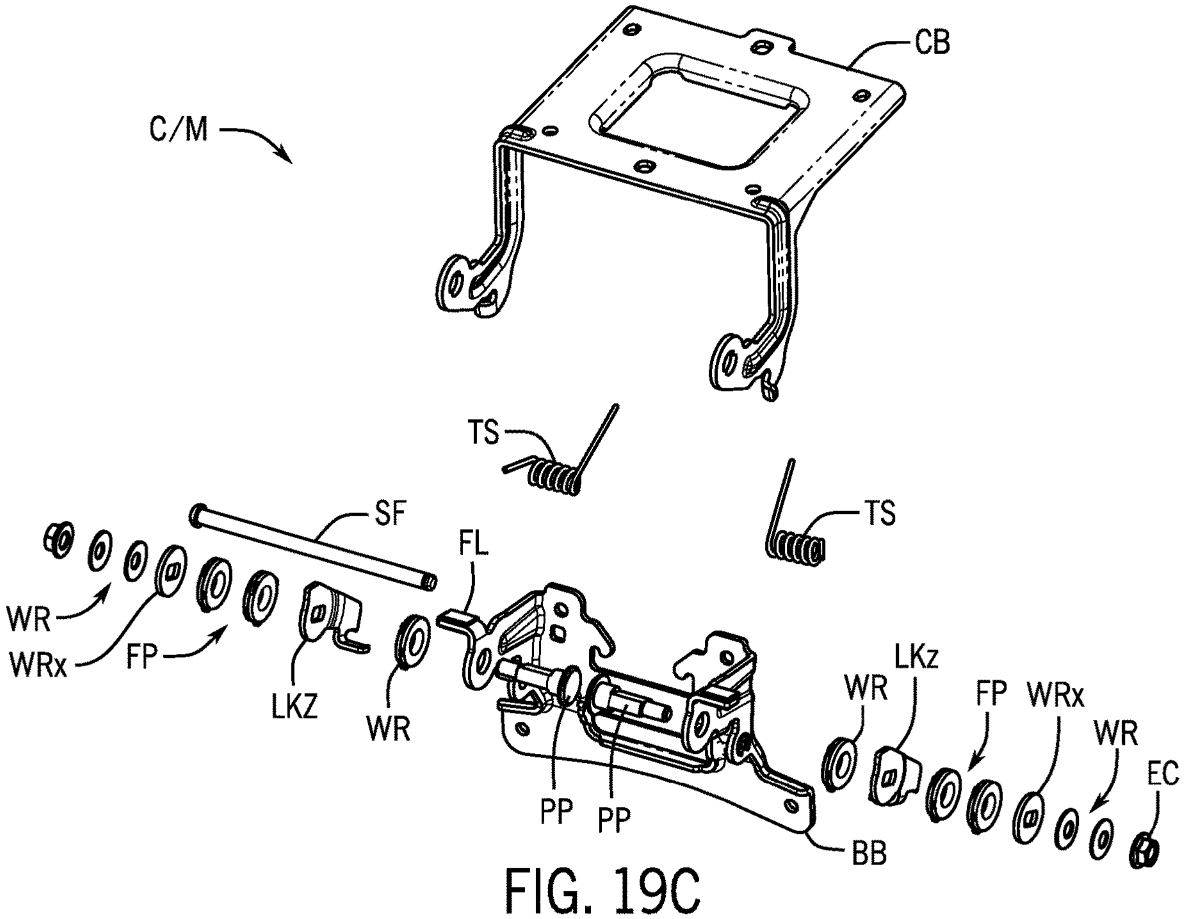
FIG. 19C is a schematic exploded perspective view of the pivot/hinge mechanism according to an exemplary embodiment.
Figure 19D:
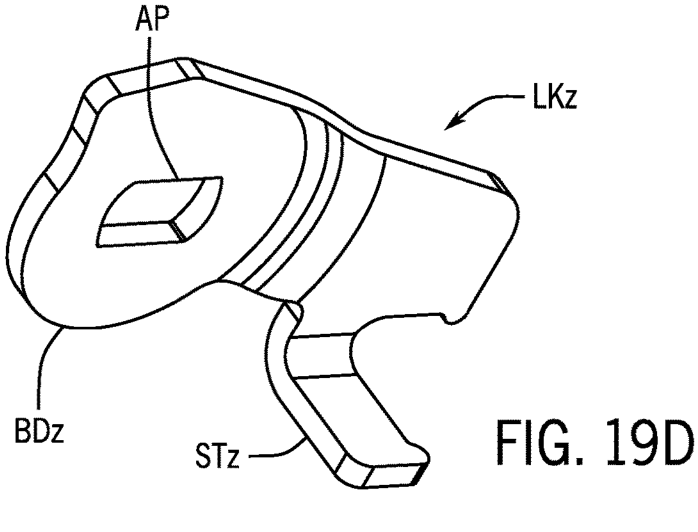
FIG. 19D is a schematic perspective view of a link for the pivot/hinge mechanism according to an exemplary embodiment.

As indicated schematically in FIGS. 2A-2H, 3A-3F and 16A-16C and TABLE C (FIGS. 20A-20O), when the cover 10 is closed, the cover 10 is pushed to rotate from the third/open position to the first/closed position by the external force by the hand applied to the cover 10; when the cover 10 rotates from the third/open position to the second/intermediate position, the cover 10 is driven to rotate to any position between the third/open position and the second/intermediate position by the hand against the friction force between the cover 10 and at least one of the friction plates 40*a*/40*b* and/or the friction force between the support plate 100 and the friction plate 40*b*, and the friction force enables the cover 10 to be retained in position against mass/weight after the hand releases, shown schematically in FIG. 16C. If the cover 10 may continue to be rotated by the hand until the cover rotates to the second/intermediate position, shown schematically in FIG. 16B; the rotating shaft 110 contacts with the first edge 121 and the third edge 123; the cover 10 continues to be overturned to the first/closed position, the cover 10 pushes the rotating shaft 110 to rotate; the pin 115 returns from the upper end to the lower end of the slot/hole 23; the rotating shaft 110 drives the torsion spring 90 to rotate together so that the torsion spring 90 is compressed until the cover 10 returns to the first/closed position and is locked by the locking mechanism, shown schematically in FIG. 16A.

As indicated schematically in FIGS. 2A-2H and 3A-3F and TABLE C (FIGS. 20A-20O), the component comprising the hinge/pivot mechanism can automatically (i.e. without an external/applied force) spring to the second/intermediate position through the drive mechanism such as a torsion spring to provide a first opening stage; then the pivot/hinge mechanism is manually moved/pivoted to start a second opening stage to rotate to the third/open position; in the second opening stage, the pivot/hinge mechanism can stop at any position after the hand is released (e.g. retained for preventing the pivot/hinge mechanism from closing automatically without an external/applied force); the retaining mechanism for the hinge mechanism of the component facilitates the occupant taking and placing items under the cover (to reduce risk of a hand being caught/trapped). See also TABLE A.

Exemplary Embodiments—C

According to an exemplary embodiment, the component comprising the hinge/pivot mechanism is configured to provide the features of assisted movement between a closed position and an intermediate position using a drive mechanism and position retention using a retaining mechanism between an intermediate and open position.

According to an exemplary embodiment, the component comprising the hinge/pivot mechanism may comprise a pivot/hinge mechanism comprising a base and a cover rotatably connected with the base; the cover rotates between a first/closed position and a third/open position relative to the base during which the cover passes through a second/intermediate position; and a drive mechanism configured for driving the cover to rotate from the first/closed position to the second/intermediate position. The cover may rotate between the second/intermediate position and the third/open position in response to a force applied to the cover by a hand; the cover may stay at any position between the second/intermediate position and the third/open position. The pivot/hinge mechanism may comprise at least one clutch mechanism; the clutch mechanism may be configured for the coupling and uncoupling of the cover and the drive mechanism; the drive mechanism may drive the clutch mechanism to rotate the cover from the first/closed position to the second/intermediate position; the clutch mechanism may be restricted by the base against a driving force of the drive mechanism on the cover when the cover rotates from the second/intermediate position to the third/open position; the cover may rotate from the second/intermediate position to the first/closed position in response to a force applied to the cover by a hand. See TABLE A.

According to an exemplary embodiment, the base may comprise a storage compartment; the storage compartment may be covered by the cover when the cover is in the first/closed position. The drive mechanism may comprise a spring, a torsion spring, a coil spring, a compression spring, a motor, or an air support.

According to an exemplary embodiment, the component comprising the hinge/pivot mechanism may comprise a pivot/hinge mechanism comprising a base and a cover connected with the base through a rotating shaft; the cover may rotate between a first/closed position and a third/open position relative to the base during which the cover passes through a second/intermediate position; the pivot/hinge mechanism may comprise a clutch mechanism configured to rotate synchronously with the rotating shaft to rotate the cover from the first/closed position to the second/intermediate position and/or to keep stationary such that the cover is retained at any position between the second/intermediate position and the third/open position. The pivot/hinge mechanism may comprise a drive mechanism configured to drive the cover to rotate from the first/closed position to the second/intermediate position. The base may comprise a slot (long hole); the clutch mechanism may comprise a pin that passes through the long hole and moves within the long hole as the cover rotates between the first/closed position and the second/intermediate position; the cover may rotate to the second/intermediate position when the pin moves to an upper end of the long hole; the clutch mechanism may comprise a support plate that rotates synchronously with the rotating shaft; the pin may be configured to be connected with any one of the support plate and the rotating shaft; the support plate may comprise a mid-circular hole; the rotating shaft may comprise a shaft segment matching with the mid-circular hole and having a mid-circular cross section; the base may comprise a stop flange; the cover may be in contact with the stop flange and retained in the third/open position when the cover rotates to the third/open position. The drive mechanism may comprise a torsion spring; the torsion spring may be secured on the base; one end of the torsion spring may be connected with the base; the other end may be pressed under the pin. The cover may comprise a shaft hole matching with the mid-circular shaft segment; the shaft hole may be formed by the intersection and overlap of two mid-circular holes and may comprise two sets of opposing first edge and third edge and second edge and fourth edge; two sides of the mid-circular shaft segment may be in contact with the first edge and the third edge when the cover is located in the first/closed position; two sides of the mid-circular shaft segment may be in contact with the second edge and the fourth edge when the cover is located in the third/open position. See FIGS. 16A-16D and 20I-20L and TABLE A.

According to an exemplary embodiment, component with a pivot/hinge mechanism may automatically (i.e. without an external/applied force) spring to the second/intermediate position through the drive mechanism such as a torsion spring to realize a first opening stage, then the pivot/hinge mechanism may be manually rotated (by hand) to start a second opening stage to turn over the pivot/hinge mechanism to the third/open position; in the second opening stage, the pivot/hinge mechanism may stop at any position after the hand is released for preventing the pivot/hinge mechanism (e.g. cover/armrest) from closing automatically (i.e. without an external/applied force which closing would not be not conducive to taking and placing items in a compartment in the base). See TABLE A.

According to an exemplary embodiment, a component with a pivot/hinge mechanism may comprise a base, a cover rotatably connected with the base and configured to rotate between a first/closed position and a third/open position relative to the base during which the cover passes through a second/intermediate position; a drive mechanism configured for driving the cover to rotate from the first/closed position to the second/intermediate position. The cover may rotate between the second/intermediate position and the third/open position in response to a force applied to the cover by a hand; the cover may stay at any position between the second/intermediate position and the third/open position. The pivot/hinge mechanism may comprise at least one clutch mechanism configured for the coupling and uncoupling of the cover and the drive mechanism; the drive mechanism may drive the clutch mechanism to rotate the cover from the first/closed position to the second/intermediate position; the clutch mechanism may be restricted by the base against a driving force of the drive mechanism on the cover when the cover rotates from the second/intermediate position to the third/open position; the cover may rotate from the second/intermediate position to the first/closed position in response to a force applied to the cover by a hand. See TABLE A.

According to an exemplary embodiment, component with a pivot/hinge mechanism may comprise a base and a cover connected with the base through a rotating shaft. The cover may rotate between a first/closed position and a third/open position relative to the base, during which the cover passes through a second/intermediate position. The pivot/hinge mechanism may comprise a clutch mechanism configured to rotate synchronously with the rotating shaft to rotate the cover from the first/closed position to the second/intermediate position and/or to keep stationary such that the cover stays at any position between the second/intermediate position and the third/open position. The pivot/hinge mechanism may comprise a drive mechanism configured to drive the cover to rotate from the first/closed position to the second/intermediate position. The base may comprise a long hole; the clutch mechanism may comprise a pin that passes through the long hole and moves within the long hole as the cover rotates between the first/closed position and the second/intermediate position. The cover may rotate to the second/intermediate position when the pin moves to upper end of the long hole. The clutch mechanism may comprise a support plate that rotates synchronously with the rotating shaft; the pin may be configured to be connected with any one of the support plate and the rotating shaft. The support plate may comprise a mid-circular hole; the rotating shaft may comprise a shaft segment matching with the mid-circular hole and having a mid-circular cross section. The base may comprise a stop flange; the cover may be in contact with the stop flange and retained in the third/open position when the cover rotates to the third/open position. The drive mechanism may comprise a torsion spring; the torsion spring may be disposed on the base. One end of the torsion spring may be connected with the base; the other end may be pressed under the pin. The cover may comprise a shaft hole matching with the mid-circular shaft segment; the shaft hole may be formed by the intersection and overlap of two mid-circular holes and may comprise two sets of opposing first and third edges and second and fourth edges; two sides of the mid-circular shaft segment may be in contact with the first edge and the third edge when the cover is located in the first/closed position; two sides of the mid-circular shaft segment may be in contact with the second edge and the fourth edge when the cover is located in the third/open position.

According to an exemplary embodiment, the pivot/hinge mechanism (for such as a vehicle floor console armrest or a floor console) will provide two functions of both spring-assisted opening and retaining position at any position (rather than a single function, one or the other as is conventional). See TABLE A.

According to an exemplary embodiment, a component with a base coupled to a cover by a pivot/hinge mechanism having drive mechanism providing a spring-assisted opening function may comprise two opening stages; in a first stage, the drive mechanism comprising an energy storage mechanism (such as a torsion spring) is used to provide force/energy to assist to open/rotate the cover relative to the door until to a certain angle at an intermediate position; then in a second opening stage, an external force of a hand is used to open/rotate the cover to the maximum/fully-open angle/position. See FIGS. 2A-2H and TABLE A. The intermediate position may be at an angle of greater than 10 degrees (for example, 15 degrees or more, 20 degrees or more); convenience and safety of the pivot/hinge mechanism is provided by a retaining mechanism to retain the position of the cover at any position between the intermediate position and the open position. See TABLE A. According to an exemplary embodiment, the pivot/hinge mechanism having the function of retaining position at any position may comprise a riveted end cap such as a star collar/nut to press a friction plate set to generate internal friction force (e.g. for retaining position); an interference fit between the friction plate and a hinge shaft may generate friction force to retain the cover in position at a designated angle. According to an exemplary embodiment, the component comprising the hinge/pivot mechanism relates to a pivot/hinge mechanism comprising: a base and a cover rotatably connected with the base; the cover rotates between a first/closed position and a third/open position relative to the base; the cover passes through a second/intermediate position; a drive mechanism is configured for driving the cover to rotate from the first/closed position to the second/intermediate position; the cover rotates between the second/intermediate position and the third/open position in response to a force applied to the cover by a hand; the cover is retained at any position between the second/intermediate position and the third/open position. The pivot/hinge mechanism of the component is configured to automatically move (i.e. without an external/applied force) the cover to the second/intermediate position through the drive mechanism (e.g. such as a torsion spring) to provide a first opening stage; then the pivot/hinge mechanism is manually rotated to start a second opening stage to rotate the pivot/hinge mechanism to the third/open position; in the second opening stage, the pivot/hinge mechanism can stop at any position after the hand is released for preventing the pivot/hinge mechanism from closing automatically (i.e. without an external/applied force as is conducive to taking and placing items in a compartment under the cover).

TABLE B

REFERENCE SYMBOL LIST

| SYMBOL | ELEMENT |
|---|---|
| V | Vehicle |
| I | Interior |
| IP | Instrument panel |
| FC | Floor console |
| C | Component |
| M | mechanism |
| B | base |
| CV | cover |
| CM | compartment |
| L | Latch/button |
| LT/R | latch/release mechanism |
| CB | Cover bracket/frame/plate |
| BB | Base bracket/frame/plate |
| FL | Flange/stop |
| DM | Drive mechanism |
| RM | Retaining mechanism |
| CM | Clutch mechanism |
| PM | Hinge/pivot mechanism |
| PJ | Pivot joint |
| PP/PPx | Pivot post/shaft |
| LK/LKx/LKz | Link |
| PN/PNx | Pin |
| BD/BDz | Body |
| AP/APx | aperture |
| ST/STz | Stop |
| FP | Friction plates |
| WR/WRx | Ring washer/gasket |
| EC | End cap/retainer |
| TS | Torsion spring |
| SF | shaft |
| SL | slot |

TABLE C

SUPPLEMENTAL REFERENCE SYMBOL LIST (FIGS. 20A-20O)

| SYMBOL | ELEMENT |
|---|---|
| 10 | cover |
| 11 | support foot |
| 12 | shaft hole |
| 20 | base |
| 21 | storage compartment |
| 22 | connecting part |
| 23 | long hole |
| 24 | flange |
| 30 | gasket |
| 50 | self-locking nut |
| 60 | support plate |
| 61 | waist circular hole |
| 62 | pin |
| 63 | stop flange |

TABLE C-continued

SUPPLEMENTAL REFERENCE SYMBOL LIST (FIGS. 20A-20O)

| SYMBOL | ELEMENT |
|---|---|
| 70 | shaft pin |
| 80 | rotating shaft |
| 81 | first shaft segment |
| 82 | second shaft segment |
| 83 | third shaft segment |
| 90 | torsion spring |
| 100 | support plate |
| 101 | waist circular hole |
| 110 | rotating shaft |
| 111 | first shaft segment |
| 112 | second shaft segment |
| 113 | third shaft segment |
| 114 | fourth shaft segment |
| 115 | pin |
| 116 | clamping slot |
| 117 | stop segment |

TABLE C

SUPPLEMENTAL REFERENCE SYMBOL LIST (FIGS. 20A-20O)

| SYMBOL | ELEMENT |
|---|---|
| 121 | first edge |
| 122 | second edge |
| 123 | third edge |
| 124 | fourth edge |
| 40a | friction plates a |
| 40b | friction plates b |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to be operated by a vehicle occupant comprising:

a base;

a cover moveable relative to the base between a closed position and an open position through an intermediate position between the closed position and the open position;

a drive mechanism configured to move the cover from the closed position toward the intermediate position;

a retaining mechanism configured to retain the cover in position between the intermediate position and the open position;

a composite mechanism comprising a clutch mechanism; and a pivot joint to couple the cover to the base;

wherein the cover is configured to be moved from the intermediate position to the open position by the vehicle occupant;

wherein the cover is configured to be moved from the open position to the closed position by the vehicle occupant;

wherein the drive mechanism is disengaged by the clutch mechanism;

wherein the clutch mechanism comprises a link on the pivot joint and a pin movable in a slot of the base;

wherein the clutch mechanism is configured to selectively engage and to selectively disengage the drive mechanism;

wherein the clutch mechanism is configured to retain in position with the base when the cover is moved between the intermediate position and the open position.

2. The component of claim 1 wherein the clutch mechanism is configured to engage the drive mechanism to move the cover from the base in movement between the closed position and the intermediate position.

3. The component of claim 1 wherein the cover is configured to be moved from the intermediate position to the open position by the vehicle occupant against resistance from the retaining mechanism; wherein the cover is configured to be moved from the open position to the intermediate position by the vehicle occupant against resistance from the retaining mechanism.

4. The component of claim 1 wherein the cover is configured to be moved from the intermediate position to the closed position by the vehicle occupant against resistance from the drive mechanism.

5. The component of claim 1 wherein the drive mechanism is engaged to provide a force to move the cover from the closed position to the intermediate position.

6. The component of claim 1 wherein the drive mechanism is disengaged by the clutch mechanism when the cover is between the intermediate position and the open position.

7. The component of claim 1 further comprising a latch to retain the cover in the closed position.

8. The component of claim 1 wherein the drive mechanism comprises at least one of (a) a spring mechanism or (b) a set of springs or (c) a torsion spring.

9. The component of claim 1 wherein the retaining mechanism comprises at least one of (a) friction plates; (b) a set of friction plates; (c) a set of aligned friction plates.

10. The component of claim 1 wherein the clutch mechanism is configured to disengage the retaining mechanism in movement between the intermediate position and the closed position.

11. A component for a vehicle interior comprising:

a base;

a cover connected with the base through a rotating shaft and configured to rotate between a first position and a third position relative to the base and through a second position between the first position and the third position;

a clutch mechanism configured (1) to rotate synchronously with the rotating shaft to rotate the cover from the first position to the second position and/or (2) to keep stationary such that the cover stays at any position between the second position and the third position; and a drive mechanism configured to drive the cover to rotate from the first position to the second position;

wherein the clutch mechanism is configured to retain in position with the base when the cover is moved between the second position and the third position;

wherein the clutch mechanism comprises a link on the rotating shaft and a pin movable in a slot of the base;

wherein the clutch mechanism is configured to selectively engage and to selectively disengage the drive mechanism.

12. The component of claim 11 wherein the pin in the slot is configured to move within the slot as the cover rotates between the first position and the second position.

13. The component of claim 12 wherein the cover rotates to the second position when the pin moves to an upper end of the slot.

14. The component of claim 12 wherein the clutch mechanism comprises a support plate that rotates synchronously with the rotating shaft; wherein the pin is configured to be connected with the support plate and/or the rotating shaft.

15. The component of claim 14 wherein the support plate comprises a circular hole; wherein the rotating shaft comprises a shaft segment matching with the circular hole and having a circular cross section.

16. The component of claim 11 wherein the base comprises a stop flange; wherein the cover is in contact with the stop flange and retained in the third position when the cover rotates to the third position.

17. The component of claim 11 wherein the drive mechanism is a torsion spring; wherein the torsion spring is on the base.

18. The component of claim 17 wherein one end of the torsion spring is connected with the base and the other end is under the pin.

19. The component of claim 18 wherein the cover has a shaft hole matching with the circular shaft segment; wherein the shaft hole is formed by the intersection and overlap of two circular holes; wherein the shaft hole comprises opposing first and third edges and opposing second and fourth edges.

20. The component of claim 19 wherein two sides of the circular shaft segment are in contact with the first edge and the third edge when the cover is located in the first position; wherein two sides of the circular shaft segment are in contact with the second edge and the fourth edge when the cover is located in the third position.

* * * * *